United States Patent
Ben-David et al.

(10) Patent No.: US 7,113,152 B2
(45) Date of Patent: *Sep. 26, 2006

(54) DEVICE, SYSTEM AND METHOD FOR ELECTRONIC TRUE COLOR DISPLAY

(75) Inventors: Ilan Ben-David, Rosh Ha'ayin (IL); Moshe Ben-Chorin, Rehovot (IL)

(73) Assignee: Genoa Color Technologies Ltd., Herzliya (IL)

( * ) Notice: Subject to any disclaimer, the term of this patent is extended or adjusted under 35 U.S.C. 154(b) by 589 days.

This patent is subject to a terminal disclaimer.

(21) Appl. No.: 10/297,672

(22) PCT Filed: Jun. 7, 2001

(86) PCT No.: PCT/IL01/00527

§ 371 (c)(1),
(2), (4) Date: Dec. 9, 2002

(87) PCT Pub. No.: WO01/95544

PCT Pub. Date: Dec. 13, 2001

(65) Prior Publication Data

US 2004/0100589 A1    May 27, 2004

Related U.S. Application Data

(63) Continuation of application No. 09/710,895, filed on Nov. 14, 2000.

(60) Provisional application No. 60/209,771, filed on Jun. 7, 2000.

(51) Int. Cl.
*G09G 3/00*    (2006.01)

(52) U.S. Cl. .......................................... 345/32; 345/84

(58) Field of Classification Search .................. 345/32, 345/84, 600, 603, 604
See application file for complete search history.

(56) References Cited

U.S. PATENT DOCUMENTS

| | | | |
|---|---|---|---|
| 1,562,068 A | 11/1925 | Shaw | |
| 3,699,244 A * | 10/1972 | Cohen et al. | ............... 348/779 |
| 4,390,893 A | 6/1983 | Russell et al. | |
| 4,751,535 A | 6/1988 | Myers | |
| 4,800,375 A | 1/1989 | Silverstein et al. | |
| 4,800,474 A | 1/1989 | Bornhorst | |
| 4,843,381 A | 6/1989 | Baron | |
| 4,843,573 A | 6/1989 | Taylor et al. | |

(Continued)

FOREIGN PATENT DOCUMENTS

WO    WO 85/10160    4/1995

(Continued)

OTHER PUBLICATIONS

U.S. Appl. No. 09/710,895, filed Nov. 14, 2000, Ben-David et al.

(Continued)

*Primary Examiner*—Jimmy H. Nguyen
(74) *Attorney, Agent, or Firm*—Pearl Cohen Zedek Latzer, LLP

(57) ABSTRACT

A device, system and a method for displaying image data of a plurality of colors, the device comprising a light source (50) for producing light having at least four primary colors, a controller (56, 58) for determining a combination of at least four primary colors according to the image data (72) for production by the light source and a viewing screen (60) for displaying the image data the combination from the controller. The present invention is not limited to combinations of colors which are produced from only three primary colors, such as red, green and blue.

10 Claims, 14 Drawing Sheets

U.S. PATENT DOCUMENTS

| | | | |
|---|---|---|---|
| 4,892,391 | A | 1/1990 | Stewart et al. |
| 4,985,853 | A | 1/1991 | Taylor et al. |
| 5,042,921 | A | 8/1991 | Sato et al. |
| 5,233,385 | A | 8/1993 | Sampsell |
| 5,416,890 | A | 5/1995 | Beretta |
| 5,448,314 | A | 9/1995 | Heimbuch et al. |
| 5,455,600 | A | 10/1995 | Friedman et al. |
| 5,592,188 | A | 1/1997 | Doherty et al. |
| 5,631,734 | A | 5/1997 | Stern et al. |
| 5,650,832 | A | 7/1997 | Poradish et al. |
| 5,650,942 | A | 7/1997 | Granger |
| 5,657,036 | A | 8/1997 | Markandey et al. |
| 5,680,180 | A | 10/1997 | Huang |
| 5,706,061 | A | 1/1998 | Marshall et al. |
| 5,751,385 | A | 5/1998 | Heinze |
| 5,777,589 | A * | 7/1998 | Gale et al. ............. 345/84 |
| 5,777,694 | A | 7/1998 | Poradish |
| 5,784,038 | A | 7/1998 | Irwin |
| 5,805,243 | A | 9/1998 | Hatano et al. |
| 5,863,125 | A | 1/1999 | Doany |
| 5,870,530 | A | 2/1999 | Balasubramanian |
| 5,872,898 | A | 2/1999 | Mahy |
| 5,892,891 | A | 4/1999 | Dalal et al. |
| 5,982,541 | A | 11/1999 | Li et al. |
| 5,999,153 | A | 12/1999 | Lind et al. |
| 6,018,237 | A | 1/2000 | Havel |
| 6,040,876 | A | 3/2000 | Pettitt et al. |
| 6,054,832 | A | 4/2000 | Kunzman et al. |
| 6,072,464 | A | 6/2000 | Ozeki |
| 6,097,367 | A | 8/2000 | Kuriwaki et al. |
| 6,129,444 | A | 10/2000 | Tognoni |
| 6,144,420 | A | 11/2000 | Jung |
| 6,147,720 | A * | 11/2000 | Guerinot et al. ............. 348/744 |
| 6,191,826 | B1 | 2/2001 | Murakami et al. |
| 6,198,512 | B1 | 3/2001 | Harris |
| 6,220,710 | B1 | 4/2001 | Raj et al. |
| 6,231,190 | B1 | 5/2001 | Dewald |
| 6,246,396 | B1 | 6/2001 | Gibson et al. |
| 6,256,073 | B1 * | 7/2001 | Pettitt ........................ 348/743 |
| 6,259,430 | B1 | 7/2001 | Riddle et al. |
| 6,262,710 | B1 | 7/2001 | Smith |
| 6,262,744 | B1 * | 7/2001 | Carrein ...................... 345/604 |
| 6,280,034 | B1 | 8/2001 | Brennesholtz |
| 6,324,006 | B1 | 11/2001 | Morgan |
| 6,334,685 | B1 | 1/2002 | Slobodin |
| 6,366,291 | B1 | 4/2002 | Taniguchi et al. |
| 6,453,067 | B1 | 9/2002 | Morgan et al. |
| 6,538,742 | B1 | 3/2003 | Ohsawa |
| 6,594,387 | B1 | 7/2003 | Pettitt et al. |
| 6,633,302 | B1 | 10/2003 | Ohsawa et al. |
| 6,870,523 | B1 * | 3/2005 | Ben-David et al. ........... 345/84 |

FOREIGN PATENT DOCUMENTS

| | | |
|---|---|---|
| WO | WO 87/42770 | 11/1997 |

OTHER PUBLICATIONS

K. Takatori et al., "Field-Sequential Smectic LCD with TFT Pixel Amplifier", SID 01 Digest, pp. 48-51.

Wyble & Berns, "A Critical Review of Spectral Models Applied to Binary Color Printing", vol. 25 No. 1.

Jeffrey A. Shimizu, "Scrolling Color LCOS for HDTV Rear Projection," SID 01 Digest, pp. 1072-1075.

Francisco H. Imai, Color Science; "Spectral reproduction from scene to hardcopy", Part 1-Multi-spectral acqusition and spectral estimation using a Trichromatic Digital Camera System associated with absorption filters.

Rosen et al, Spectral Reproduction from Scene to Hardcopy II: Image Processing. Munsell Color Science Laboratory, RIT—Proceedings of SPIE vol. 4300[2001].

Pointer, M.R., "The Gamut of Real Surface Colours", Color Research & Appl. 5(3):145-155, 1980.

Gunter Wyszecki & W.S. Stiles, Color Science; Concepts and Methods, Quantitative Data and Formulae, 2D. Ed. 1982, pp. 179-183.

Ajito et al, "Expanded Color Gamut Reproduced by Six-Primary Projection Display", Proc. SPIE, vol. 2954 (2000) pp. 130-137.

Ajito et al, "Multiprimary Color Display for Liquid Crystal Display Projectors Using Diffraction Granting", Optical Eng.38(11) 1883-1888 (Nov. 1999).

Office Action concerning U.S. Appl. No. 09/710,895 mailed Apr. 24, 2002.

Office Action concerning U.S. Appl. No. 09/710,895 mailed Jan. 13, 2003.

Office Action concerning U.S. Appl. No. 09/710,895 mailed Jun. 30, 2003.

* cited by examiner

DEVICE, SYSTEM AND METHOD FOR ELECTRONIC TRUE COLOR DISPLAY

CROSS REFERENCE TO RELATED APPLICATIONS

This application is a National Phase Application of PCT International Application No. PCT/IL01/00527, International Filing Date Jun. 7, 2001, claiming priority of U.S. patent application Ser. No. 09/710,895, filed Nov. 14, 2000 and U.S. Provisional Patent Application No. 60/209,771, filed Jun. 7, 2000.

FIELD AND BACKGROUND OF THE INVENTION

An embodiment of the present invention relates to a device, system and a method for electronic true color display, and in particular, to such a device, system and method in which an expanded color space is available for display through an electronic display device such as a monitor of a computational device, for example.

The perception of color by human vision involves the impact of light of different wavelengths in the visible spectrum (400 nm–780 nm) on the human eye, and the processing of the resultant signals by the human brain. For example, in order for an individual to perceive an object as "red", light in the range of wavelengths of about 580–780 nm must be reflected from the object onto the retina of the eye of the individual. Depending upon the spectral distribution of the light and assuming normal color vision, the individual perceives different colors from a wide range of such colors.

In addition, the individual perceives various characteristics of the color. The color itself is also termed the "hue." In addition, saturation determines the intensity of the color, such that a color shade which is saturated is perceived as highly vivid, while a pastel version of the same color is less saturated. The combination of hue and saturation forms the chrominance of the color. As perceived by the individual, color also has brightness, which is the apparent or perceived energy of the color, such that the color "black" is actually the absence of brightness for any color.

Although color is a complex combination of physical and physiological phenomena, as previously described, color matches to some viewable colors can be obtained with combinations of only three colors. Typically certain spectra of red, green and blue are used. These three colors may be termed additive primaries. By combining different amounts of each color, a wide gamut of colors can be produced. Unfortunately, this spectra still falls short of the complete gamut of colors which are visible to the human eye (see for example www.barco.com as of Sep. 28, 2000). Not every color can be expressed as a mixture of three primary colors in combination. Instead, certain colors can only be adequately represented mathematically if the value for one or more primary colors is negative. While such negative values are theoretically possible, physical devices cannot produce them.

An international standards body, CIE (Commission Internationale de l'Eclairage), has defined a special set of imaginary primaries, for which all colors can be represented by positive values. The primaries are imaginary in the sense that they are a mathematical creation, which cannot be produced by a physical device. Nevertheless, the system is very useful for the presentation of color, as is described below.

The system is defined by the color matching functions, $X(\lambda), Y(\lambda)$ and $Z(\lambda)$, which define the response of the primaries to a monochromatic excitation of wavelength, $\lambda$. Furthermore, $Y(\lambda)$ is chosen to be identical to the brightness sensitivity of the color sensors in the human eye. Using these primaries, each color can be represented by three positive values XYZ, where Y is proportional to the brightness of the excitation. From the XYZ values a normalized set xyz is created, by dividing each of the values by X+Y+Z. In the new set x+y+z=1. If two of the three values are provided, the third value may be derived from these values. Thus, a color may be represented by a set of two values (for example, x and y) on a chromaticity diagram as shown in Background Art FIG. 1. Information which is lost in the process of normalization is the brightness of the color, but all chromatic information is kept.

The chromaticity diagram in FIG. 1 describes a closed area in a shape of horseshoe in the xy space. The points on the border of the horseshoe (shown as line 10), known as the spectrum locus, are the xy values corresponding to monochromatic excitations in the range from 400 nm to 780 nm as marked. A straight line 12, closing the horseshoe from below, between the extreme monochromatic excitation at the long and short wavelengths, is named the purple line. The white point, which is the point at which the human eye perceives the color "white", is lying inside the closed area. All colors discernible by human eye are inside this closed area, which is called the color gamut of the eye. If an excitation is monochromatic, it is placed on the horseshoe border. If it is spectrally wide, thereby containing light of a plurality of spectra, its coordinates lie inside the gamut.

The electronic reproduction of color, for example by an electronic display device such as a computer monitor, is currently performed by using three primaries: typically spectra of red, green and blue. These systems cannot display the full range of colors which are available to the human eye. The reason for the inability of such devices to display the full range of colors perceived by the human eye is that some colors are presented by negative values of one or more of the primaries, which cannot be realized by a physical light source. Certain background art devices and systems use a fourth "color", which is actually light passed through a neutral filter, or "white light", and which is used for controlling brightness of the displayed color, as described for example with regard to U.S. Pat. No. 5,233,385. However, the use of the neutral filter does not affect the ultimate gamut of colors which can be displayed.

Electronic display devices which operate according to the three-primary red, green, blue system include such devices as computer monitors, televisions, computational presentation devices, electronic outdoor color displays and other such devices. The mechanism for color display may use various devices, such as Cathode Ray Tubes (CRT), Liquid Crystal Displays (LCD), plasma display devices, Light Emitting Diodes (LED) and three-color projection devices for presentations and display of video data on a large screen, for example.

As an example of the operation of such a device, CRT displays contain pixels with three different phosphors, emitting red, green and blue light upon excitation. In currently available displays, the video signal sent to the display specifies the three RGB color coordinates (or some functions of these coordinates) for each of the pixels. Each coordinate represents the strength of excitation of the relevant phosphor. An individual viewing the display integrates the light coming from neighboring colored pixels to get a sensation of the required color. The process of integration is automatically performed, without individual awareness of the process, and occurs through a combination of the physiological activity of the eye itself and of processing of signals from the eye by the brain.

The red, green and blue emissions of the phosphors define three points in the xy plane. The points marked 14, 16 and 18 in FIG. 2 represent red, green and blue phosphors respectively of a typical phosphor set used for televisions and related devices. As can be seen in FIG. 2, these points 14, 16 and 18 lie inside the spectral gamut of the eye's perceptual range, which is the range of spectral values for light visible to the human eye. Many colors can be created using these primaries. However, not all colors can be created, as previously described, since only positive values of RGB are possible. These positive combinations represent colors which are inside a triangle 20, created by the three primaries, as can be easily seen from FIG. 2. However, a significant portion of the gamut of the eye lies outside triangle 20, and therefore cannot be displayed by using the three phosphors system.

Part of this problem could be alleviated by using lasers or other spectrally narrow light, since the emission of the phosphors is spectrally wide, thereby causing the triangle of values lying within the gamut of produced colors to be even smaller. A similar problem is found with LCD display devices which operate with "white" light passed through color filters, and which must also have a wide spectrum for the filters in order for enough light to pass through the filter. However, the problem of the restricted gamut for display of colors cannot be solved by using monochromatic light sources, such as lasers; although the triangle created is much larger, large parts of the gamut of the human eye still cannot be displayed with only three primary colors, regardless of the type of light source.

A more useful solution would enable a wider range of colors to be displayed by the electronic display device, for example by a television or a computer monitor. Such a solution would be efficient and would be suitable for both large electronic display devices and more small, portable devices. Attempts to define such a solution can be found, for example, in PCT Application Nos. WO 97/42770 and WO 95/10160, which both describe methods for processing image data for display with four or more primary colors. However, neither of the Applications teaches or suggests a device which is capable of such a display of four or more primary colors.

U.S. Pat. Nos. 4,800,375 and 6,097,367 both describe attempts to provide such devices. However, neither disclosed device is a suitable solution to this problem, as both devices have significant disadvantages. For example, U.S. Pat. No. 4,800,375 describes a flat, backlighted screen, in which the light source and controller form a single unit. However, since each pixel has a different color, increasing the number of primary colors both increases the cost of production, since additional light source/controller units must be added for each color, and also decreases the resolution of the screen. Similar problems are also found with the disclosed device of U.S. Pat. No. 6,097,367, which is based on LED (light emitting diodes). Thus, these disclosed background art devices suffer from significant drawbacks, particularly with regard to the decreased resolution of the displayed image as the number of primary colors which form the image is increased.

Therefore, there is an unmet need for, and it would be highly useful to have, a device, system and a method for providing an expanded color spectrum for the electronic display and reproduction of color, which would operate efficiently and which would be suitable for display devices of different sizes, and which would not result in decreased resolution of the displayed image as the number of primary colors is increased.

SUMMARY OF THE INVENTION

An embodiment of the present invention provides a device, system and a method for displaying an expanded gamut of colors. The present invention is suitable for various types of electronic display devices, such as televisions and monitor devices ("monitors") for computational devices, for example. An embodiment of the present invention operates by using more than three primary colors. As previously described, the term "primary color" specifically does not include light from a white or polychromatic light source after only being passed through a neutral filter. Thus, unlike background art systems and devices, the present invention is not limited to combinations of colors which are produced from only three primary colors, such as red, green and blue for example.

According one embodiment of to the present invention, there is provided a device for displaying image data of a plurality of colors, the device comprising: (a) a light source for producing light having at least four primary colors; (b) a controller for determining a combination of at least one of the at least four primary colors according to the image data for production by the light source, such that the controller is separate from the light source; and (c) a viewing screen for displaying the image data according to the combination from the controller.

According to another embodiment of the present invention, there is provided a system for displaying image data of a plurality of colors, the system comprising: (a) a light source for producing light having at least four primary colors; (b) a converter for converting the image data to a combination of at least one of the at least four primary colors to form a map; (c) a controller for controlling a production of the combination from the light source, wherein the controller is separate from the light source; and (d) a viewing screen for displaying the image data from the combination from the light source as controlled by the controller.

According to yet another embodiment of the present invention, in a device for displaying image data of a plurality of colors, the device comprising a light source for producing light having at least four primary colors and a viewing screen for displaying the image, the light being projected onto the viewing screen, there is provided a method for creating the image for displaying, the method comprising the steps of: (a) producing light by the light source of at least four primary colors; (b) determining a path for light of each primary color according to the image data; and (c) projecting the light of each primary color according to the path onto the viewing screen to form the image.

In another embodiment of the present invention, a set of primaries or filters is chosen so that a spectral reconstruction of certain set of colors is obtained. In order to increase the accuracy of colors represented by a set of primaries, and to increase the likelihood that different human observers will perceive certain colors accurately, a set of primaries may be created based on a spectral match rather than a calorimetric match, and such a set of primaries may be used in a display system according to an embodiment of the present invention. A target set of spectra to be reproduced are chosen, and a set of 1 primaries are chosen which optimally reproduce the set of target spectra.

Various embodiments of the present invention provide for the conversion of source data (e.g., RGB or YCC-type data) to data suitable for a display using at least four primaries. A graph or plot is created which includes the n-primaries used in the display and in addition includes one or more middle points. The middle point or points define triangles with adjacent pairs of primaries. The source data is mapped to one of the triangles, and a solution is found for the constant levels for the relevant pair of primaries and the relevant middle point. The constant levels for the primaries not participating in the triangle may be found. These constant levels may be used to control the levels of the primaries in the display.

In one embodiment of the present invention, a set of filters is chosen to gain the widest spectral coverage possible while maintaining white balance, efficiency and brightness. A set of filters is chosen so that at least three of the filters include certain frequencies located near the corners of the chromaticity horseshoe. In one embodiment, a set of at least three primaries is chosen, such that at the filters for at least three primaries in the set have the following characteristics: one filter does not pass wavelengths substantially below 600 nm, another does not pass wavelengths substantially above 450 nm, and the third is a narrow band-pass filter with a central frequency in the range of approximately 500–550 nm, whose total width does not substantially exceed 100 nm. Additional primaries may be chosen.

Hereinafter, the term "neutral" refers to light having a spectral distribution, which does not differ substantially from that of a white light source, as obtained for example by passing light from such a white source through a neutral density filter.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
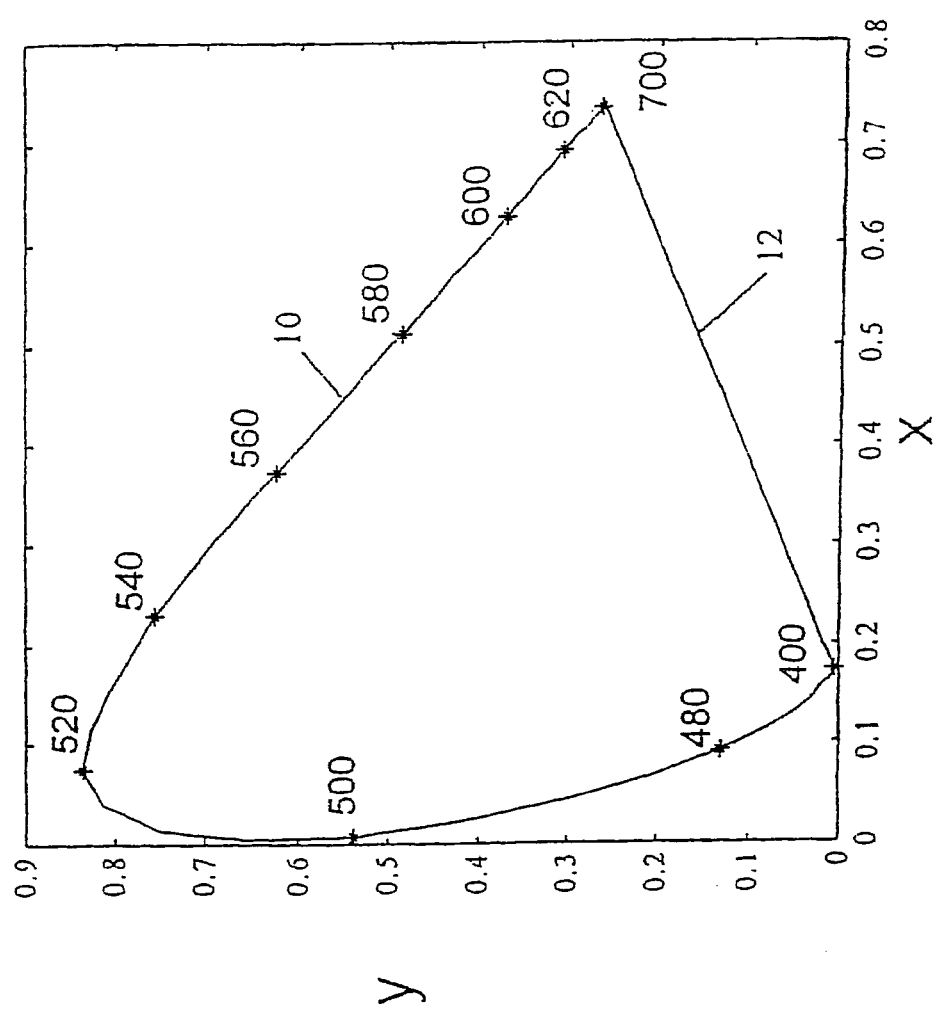
FIG. 1 is a Background Art chromaticity diagram.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

An embodiment of the present invention provides a device, system and a method for displaying an expanded gamut of colors. The present invention is suitable for various types of electronic display devices, for example televisions and monitor devices ("monitors") for computational devices. An embodiment of the present invention operates by using more than three primary colors. As previously described, the term "primary color" specifically does not include light from a white or polychromatic light source after only being passed through a neutral filter. Thus, unlike background art systems and devices, the present invention is not limited to combinations of colors which are produced from only three primary colors, such as red, green and blue for example.

According to preferred embodiments of the present invention, light from six primary colors is used, although of course any number of primary colors is operative with the present invention, as long as at least four such primary colors are included. The use of six primary colors is preferred since the gamut which is covered by the resulting hexagon is much larger than the triangle 20 which is produced by RGB phosphors, for example, yet can still be efficiently produced as part of an electronic color display, as explained in greater detail with regard to the preferred embodiment below. As shown as a hexagon 22 with regard to FIG. 2, with points 24, 26, 28, 30, 32 and 34, the gamut of colors provided by such a combination of primary colors is much larger than the simple triangle 20 which is produced by RGB phosphors. A description of an exemplary but preferred embodiment for the method for selecting the spectra for such primary colors is provided with regard to FIGS. 5A and 5B below.

With regard to the type of light source, or device for producing light for each primary color, different types of sources and/or mechanisms could optionally be used with the present invention. Optionally and preferably, in order to obtain the best coverage of the gamut, the light for each primary color should preferably be monochromatic. Of course, lasers could optionally be used as the source of light for the primary colors for the present invention. Monochromatic excitation can also optionally be produced by passing white light through a narrow spectral filter. However, as the spectral bandwidth of the excitation is limited, the brightness of the resultant light becomes lower (assuming that the brightness of the source stays the same). On the other hand, as the spectrum of the primary excitation becomes wider, the resultant color gamut for the electronic color display becomes more restricted. Therefore, the interplay between the purity and the brightness of the primaries should be considered, assuming that lasers are not used as the source of monochromatic light.

In addition, various display mechanisms are optionally used with the present invention, which also affect the choice of light source and/or device for production of the primary colors. The preferred display mechanism is projection of light onto the viewing screen, for an optical projection system. Projection displays can work simultaneously, in which light of all colors illuminates the viewing screen at the same time; or sequentially, in which light of the different colors illuminates the screen one after another. For the latter type of display, the vision system of the human eye perceives combined colors through temporal integration, as the sequential display of colors is performed sufficiently rapidly.

Display systems of the second type are based on spatially modulating colored light and projecting it on a display screen. The spatial modulation can optionally be performed by using a liquid crystal spatial modulator, in which case a source of polarized light should be used, or alternatively, for example, by a digital micro-mirror device (DMD) such as that produced by Texas Instruments (USA), which allows the use of non-polarized light. Of course other types of devices for performing spatial modulation are optionally used, and are encompassed by the scope of the present invention.

The spatial modulation can optionally be performed with analog or binary levels or gradations, according to the type of modulator device which is used. Nematic liquid crystal modulators, for example by CRL Opto (United Kingdom), or Kopin Inc. (USA), allow for analog "gray levels", while Ferroelectric liquid crystal modulators, such as from Micropix Technologies (United Kingdom) or LightCaster™ from Displaytech (USA), and DMD are binary devices. If a binary modulator device is used for spatial modulation, "gray levels" are achieved by controlling the duration of the illumination, and/or the intensity of the light, incident on the spatial modulator.

Light production mechanisms based on optical projection are preferred over those mechanisms which are based on light emission at the screen or other portion of the display device. Examples of light emission mechanisms include CRT, field emission and plasma displays, in which the phosphors at the screen or other device actually emit the light; LED screens in which small electro-luminescent diodes emit the light; and flat LCD screens in which each of the pixels has an individual color filter. In these systems, physically small emitters of different primary colors, which therefore produce a small, focused point of colored light, are placed in close vicinity. The eye then automatically integrates the emitted light from neighboring pixels to obtain the color sensation.

However, these light emission systems suffer from a number of disadvantages. First, the addition of primary colors decreases the resolution of the display, unlike for optical projection mechanisms, in which the addition of primary colors does not affect the resolution of the display. Second, adaptation of the pixel matrix is required in order for the display screen to be able to display more than three colors. For CRT and LED mechanisms, special phosphors and diodes, respectively, must be developed. For LCD displays, the set of color filters must be adapted, in order to provide four or more primary colors through these filters. All of these adaptations require the addition of extra units, such as extra phosphors or extra diodes, which therefore increases the cost of the system in order to be able to display more colors. By contrast, as described in greater detail below, the adaptations which are required for optical projection systems are relatively minor, and do not result in increased cost for the system. Thus, optical projection systems are preferred over light emission systems.

The principles and operation of a device, system and method according to the present invention may be better understood wit reference to the drawings and the accompanying description.

Figure 3A:
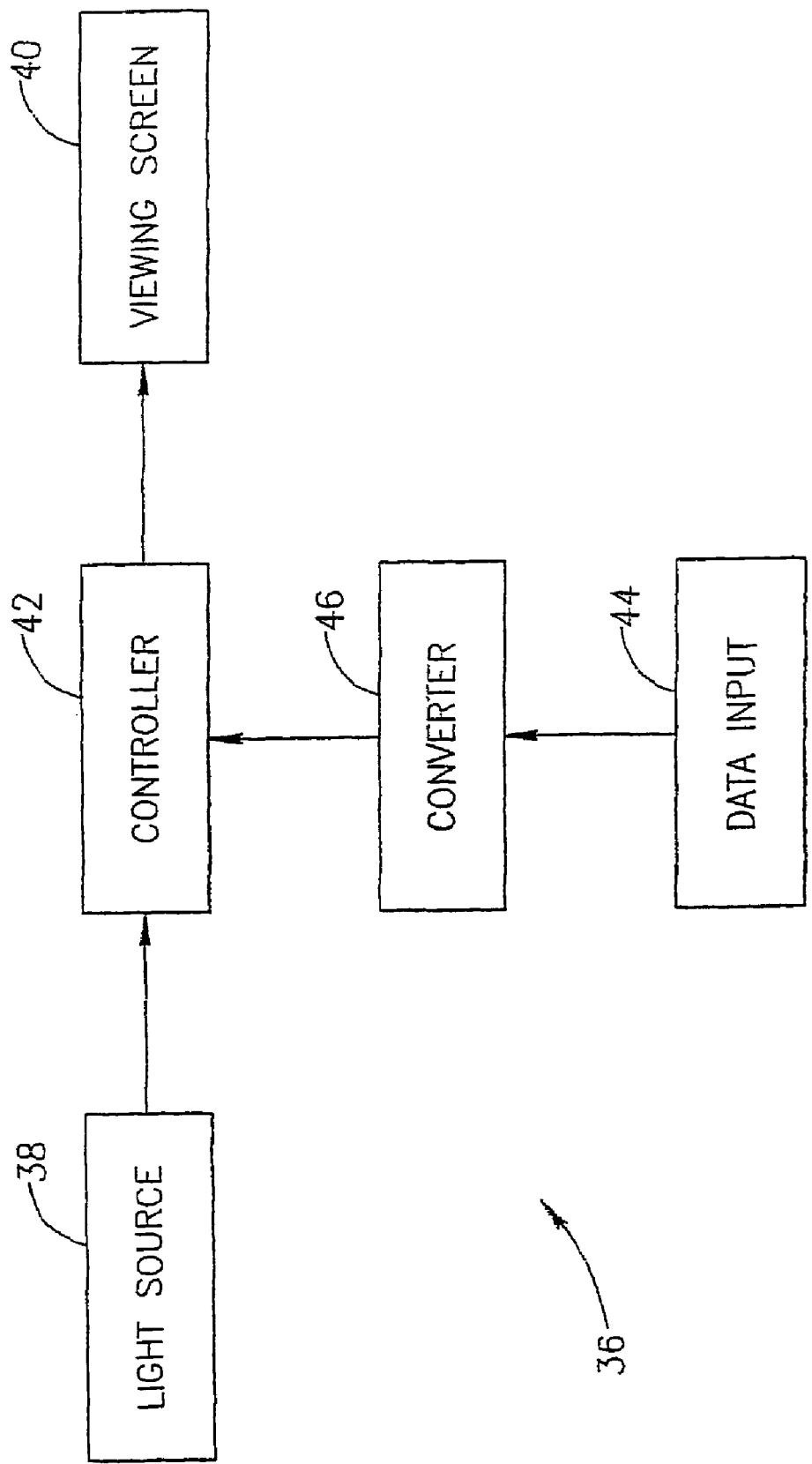
FIGS. 3A and 3B are schematic block diagrams of two embodiments of an exemplary display device and system according to an embodiment of the present invention.
Figure 3B:
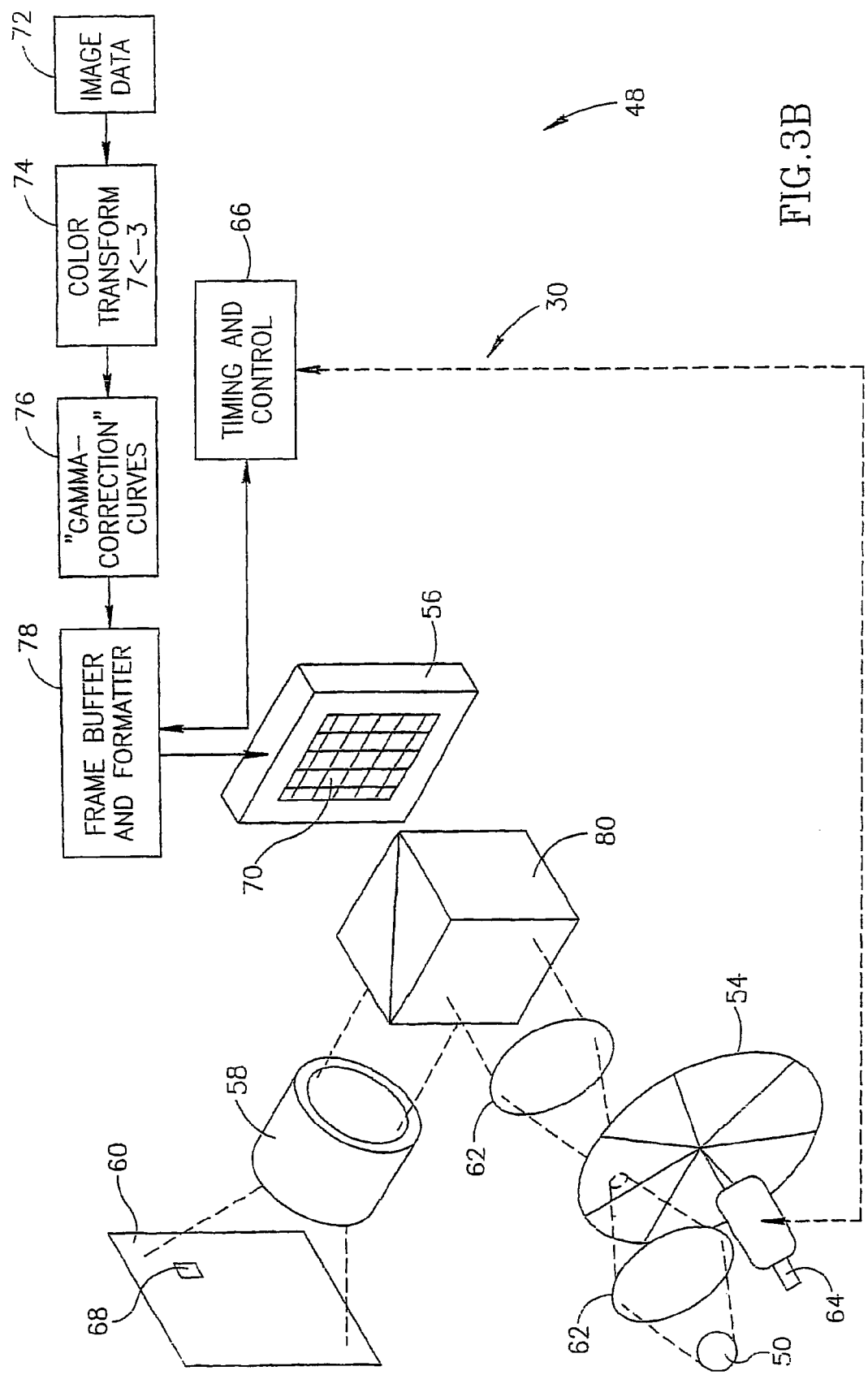

Referring now to the drawings, FIGS. 3A and 3B are schematic block diagrams of two embodiments of a display device and system for displaying at least four primary colors according to an embodiment of the present invention. FIG. 3A shows a basic embodiment of the display device and system, while FIG. 3B shows a preferred embodiment featuring a light projection mechanism.

As shown in FIG. 3A, a system 36 features a light source 38 for producing light of at least four primary colors. The light from light source 38 is displayed on a viewing screen 40, thereby enabling the human viewer to see the colors of the displayed image (not shown). Preferably, the light from light source 38 is projected onto viewing screen 40. In order for each color to be properly displayed in the correct location of the displayed image, a controller 42 controls the production of light of each color, such that the correct light is shown at the correct location of viewing screen 40. Preferably, controller 42 is separate from light source 38, such that these two components are not combined into a single component.

Optionally and more preferably, for the preferred projection embodiment of system 36, light source 38 projects light of at least four colors, without being able to control the location of the projected light onto viewing screen 40. Controller 42 then determines the relative location of light of each color as projected onto viewing screen 40, for example with a spatial light modulator and/or another system of mirrors and/or lenses, as described in greater detail below with regard to FIGS. 3B and 7.

In order for controller 42 to be able to determine the correct light for being displayed at each portion of viewing screen 40, controller 42 optionally and more preferably receives data from a data input 44, which may optionally be digital or analog. Most preferably, controller 42 also receives instructions and/or commands from a converter 46, which lies between data input 44 and controller 42. Converter 46 converts the data from data input 44 into a format which is suitable for controller 42, and also includes any necessary instructions and/or commands for enabling controller 42 to be able to understand the data. Optionally, converter 46 may also convert the data from an analog signal to digital data, such that controller 42 is only required to receive digital data.

FIG. 3B shows a second embodiment of an exemplary display device according to an embodiment of the present invention, which is based on a sequential light projection system, similar to that suggested in U.S. Pat. No. 5,592,188. However, it should be noted that the present invention extends the suggested background art system to four or more primary colors, while the background art system is limited to electronic color displays which use only three primary colors. In addition, this embodiment of the present invention is only illustrative and is not intended to be limiting in any way.

A system 48 is based on passing white light from a source 50 through appropriate color filters 52 to form colored light of a defined spectral range. As previously described, preferably system 48 features six such colored filters 52, which as shown may optionally be configured in a color filter wheel 54. In this example, the combination of light source 50 and color filters 52 can be considered to form at least part of the light source of FIG. 3A above, optionally with other components involved in the production of the light itself.

This colored light then illuminates a spatially modulated mask 56, also known as an SLM (spatial light modulator) which determines the particular color for being displayed at each portion of the image (typically according to each pixel), by determining whether light of that color is permitted to pass for illuminating that pixel. The colored light for this image is then projected by a projection lens 58 onto a viewing screen 60. Viewing screen 60 displays the resultant colored image to the user (not shown). Spatially modulated mask 56, and more preferably the combination of spatially modulated mask 56 and projection lens 58, can be considered to be an example of the controller from FIG. 3A.

Spatially modulated mask 56 is optionally either a binary modulation type or a continuous modulation type.

Examples of the continuous modulation type include, but are not limited to, polarization rotation devices such as LCD (liquid crystal device), electro-optical modulator and magneto-optical modulator. In these devices, the polarization of the impinging light is rotated. In this context, LCD features an organized structure of anisotropic molecules, for which the axis of anisotropy is rotated by the application of voltage, thereby rotating the polarization. For the electro-optical modulator, anisotropic crystals are featured, which change the rotation of the polarization of the light radiation, due to a change of the refractive index along the different axes, as a result of the applied voltage. The electro-optical modulator can be applied for a continuous, non-binary implementation or for a binary implementation. Magneto-optical modulators are devices in which a magnetic field is used to rotate the polarization, by changing the electro-optical properties of the crystal.

Examples of the binary modulation type include, but are not limited to, DMD, FLC, quantum well modulator and electro-optical modulator. DMD (digital micro-mirror device) is an array of mirrors, each of which has two positions, either reflecting light toward a viewing screen 60, or reflecting light away from viewing screen 60. FLC (ferroelectric liquid crystal) features liquid crystals, which have only two bi-stable orientation states, thereby changing the polarization of the light radiation to one of two states (effectively "on" and "off"). A quantum well modulator is a device in which voltage is applied in a quantum well, which then changes transmission and reflection properties for light by changing the states of the electrons in the well, to one of two levels according to the applied voltage. The electrons are changed from being absorptive to being transmissive.

In order for the light to be directed through the appropriate filter 52, preferably the light is focused by a condenser lens 62, optionally implemented as two such lenses 62 for the purposes of illustration only and without any intention of being limiting. The focused light is then directed through one of the filters on filter wheel 54. Filter wheel 54 holds at least four color filters 52, the transmission spectra of which is designed to give a coverage of a major portion of the gamut of the eye. A motor 64 optionally and preferably rotates filter wheel 54 in front of light source 50, so in each turn spatially modulated mask 56 is illuminated by all colors in filter wheel 54 sequentially. Preferably, the rate of rotation is at the frame frequency, which is the frequency at which the full-color image on viewing screen 60 is refreshed. Typical frame frequencies (rotation frequencies) are in the range of 30–85 Hz.

More preferably, the loading of the data into spatially modulated mask 56 is synchronized by a timing system 66, according to the rotation of filter wheel 54. The light beam is spatially modulated by spatially modulated mask 56, so that the apparent brightness of each primary color varies at different portions of viewing screen 60, typically according to each pixel of the image. Each position 68 on viewing screen 60 is preferably associated with a certain pixel 70 in spatially modulated mask 56. The brightness of that position is determined by the relevant data pixel in the image. The values for the pixels of the image are optionally and preferably retrieved from an image data file 72. The human viewer integrates the sequential stream of the primary images to obtain a full color image with a wide gamut of colors when viewing the image as projected onto viewing screen 60.

An implementation using liquid crystal modulators requires the use of polarized light. For reflecting devices, such as Liquid Crystal Over Silicon (LCOS) devices, the same polarizer, usually a polarizing cube beam splitter, can be used for polarizing the incident light and for analyzing the reflected light. For transmission devices, such as active matrix LCD based on thin-film-transistor technology (TFT) as provided by Epson, Kopin (USA) and other vendors, for which light passes through the pixilated matrix, linear polarizers are placed before and after spatially modulated mask 56. The exemplary but preferred implementation shown in FIG. 3 is based on a reflecting LCOS device for spatially modulated mask 56, and therefore a polarizing cube beam splitter 80 is included in system 48. It should be noted that this is for the purposes of illustration only, and other implementations of system 48 are also possible as based on other modulators, such as those devices which are described as examples of other such spatial modulation devices.

An exemplary description of the flow of data and data handling is also shown with regard to FIG. 3B. The data is optionally given as a digital image file 72 as shown, or alternatively as an analog video signal (not shown). The data optionally and typically arrives in a raster format, particularly for display systems associated with computers. The raster format is a signal presenting the R, G and B values of pixel-after-pixel, line-after-line for a film frame. In interlace video, the frame is divided to two fields, which are sent one after the other, the field containing only the odd lines, and the second field containing the even lines. A typical analog graphics card for a computer monitor receives digital image data, and then sends the image data as analog signals on five lines, three for R, G and B signals and two for synchronization signals. The R, G and B signals are non-linear functions of the RGB value of the relevant pixel in the image. This function (known in the art as a gamma-correction function) is such that the response of a CRT to its outcome is linear on the original pixel value, such that the brightness of the emission from a particular phosphor depends upon the voltage of the received signal. In a video signal, the RGB signals are transformed into other combinations, representing luminance and chrominance of the pixel, and each of them is encoded separately (for example, using YCC type-formats).

The analog image data is optionally and more preferably transformed into digital data for the purpose of the present invention, for example in order to correct for various effects caused by the video/graphics card interface to obtain digital RGB (three-color) image data 72. Examples of effects for which such correction may optionally and preferably be desired include but are not limited to, effects of analog to digital (A/D) conversion and video decoding, the effect of de-gamma conversion, and the effect of converting from interlace to non-interlace signals. According to preferred embodiments of the present invention, the data is only presented in one field, and not in two or more fields as for the interlaced video of the background art. Therefore, the data is preferably subjected to a transformation such that the data is not interlaced before being sent to the frame buffer, as described in greater detail below.

Digital RGB data can also optionally and more preferably be obtained directly from digital graphic cards, available from ATI, Number Nine Revolution and other vendors.

In any case, the digital RGB image data or YCC type-data is then manipulated in a multi-color transformation module 74, as described in greater detail below, into a color format which includes data for each color of color filters 52, with N-bits of data per color (for example, 7 colors, of which one is white, and 8 bits per color).

The resulting 7 color channels are more preferably subjected to a gamma correction process for the response of spatially modulated mask 56 by a gamma correction module 76. Gamma-correction module 76 performs a non-linear transformation, known as a "de-gamma" process, for each of the data channels. The transformation is preferably non-linear since the incoming data is typically non-linear in order to correct for such effects of components within the system on the signal as the cable to viewing screen 60 (not shown), such that the output of the transformation is preferably linear. Preferably, this transformation is performed by applying several look-up tables (one or more for each channel), which contain the output values corresponding to all possible input values. The use of such look-up tables provides for a standardized, corrected, linear output which can be more precisely displayed with the system of the present invention.

The corrected data is then loaded into a frame buffer and format module 78 which arranges the stream of data in a format consistent with the electronic requirements of spatially modulated mask 56. Frame buffer and format module 78 is a memory device for holding the data of the image. Typically, the data is held in the same geometrical arrangement as the pixels of the image, and of spatially modulated mask 56.

For the system described above, the frame buffer itself, of frame buffer and format module 78, is preferably divided into bit planes. Each bit plane is a planar array of bits, in which each bit corresponds to one pixel on spatially modulated mask 56. Each bit plane actually represents at least a part of the data for each color, such that if a pixel is to have a component which includes a particular primary color, that pixel is represented by a particular bit on the appropriate bit plane which features that primary color. The bit planes are arranged one below the other to form a three-dimensional arrangement of the data, from the most significant to the least significant bit. There are m×N bit planes (m is the number of bits/color channel, N is the number of color channels).

Timing system 66 can be considered to be an example of at least a portion of the converter of FIG. 3A above, more preferably in combination with multi-color transformation module 74, gamma correction module 76 and frame buffer and format module 78.

The data is usually presented as 8 bits (256 levels) per each of the seven primary colors. The various "gray levels" of the illumination can be achieved in different ways depending on the type of spatially modulated mask 56 which is used. For "analog" modulators, such as nematic LC modulators for example, the gray level is determined by the amount of the optical axis rotation, controlled by the voltage applied to the device. Each frame requires seven "updates", or changes to the configuration, of spatially modulated mask 56, with one update for each of the primary colors of color filters 52. For a frame refresh rate of 50 Hz for viewing screen 60, this corresponds to an update rate of 350 Hz. The eight bit planes corresponding to the relevant color are retrieved from the frame buffer itself, of frame buffer and format module 78, and are optionally and preferably transformed into analog signals. These analog signals are then amplified and applied to spatially modulated mask 56.

For the "binary" type of spatially modulated mask 56, such as digital micro-mirror devices (DMD) by Texas Instruments or Ferroelectric Liquid Crystal (FLC) SLM by MicroPix, Displaytech and other vendors, gray levels are achieved by pulse width modulation (PWM) of the light, a technique which is well known in the art. In order to perform pulse width modulation of the light, m bit planes, shown here for m=8 planes, for each primary color are loaded into spatially modulated mask 56 during the period for displaying the relevant color. For a frame rate of 50 Hz and a 7 color display, the time for each color to be displayed is 20 ms/7=2.85 ms (20 ms=1/50 Hz). During this time, 8 bit planes should be loaded into spatially modulated mask 56, resulting in an update rate of 2.8 kHz. However, if PWM is applied to the light, the least significant bit plane should be presented on spatially modulated mask 56 for only 11.2 microseconds.

To extend the display period and therefore to avoid such a rapid refresh or change rate for spatially modulated mask 56, optionally and preferably PWM is not applied to the light. Instead, the illumination time is preferably divided uniformly between the bit planes. The different bit values are then optionally and more preferably created by changing the brightness of light incident on spatially modulated mask 56. The brightness of the incident light is optionally and most preferably altered by using a continuously varying neutral density (ND) filter, as described in greater detail below.

Figure 4A:
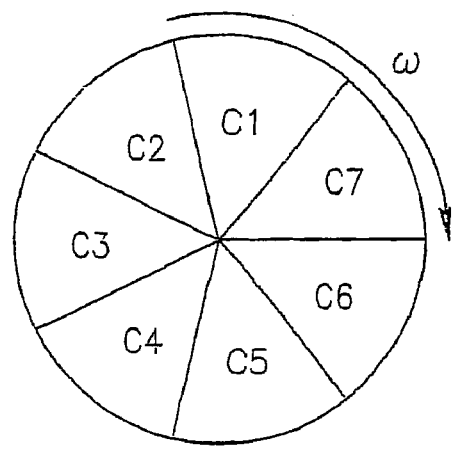
FIGS. 4A–4C illustrate an implementation of an embodiment of the present invention with an exemplary neutral density (ND) filter, with an illustrative implementation for the filter arrangement of the color wheel with such an ND filter (FIG. 4A), the timing sequence for operation of the color filter wheel (FIG. 4B), and a graph of the density of the ND filter (FIG. 4C)

FIG. 4A shows an illustrative implementation for the filter arrangement of the color wheel with such an ND filter 82. The color filter wheel is divided into several color sections, labeled as "C1" to "C7" respectively, the width of each is $2\pi/N$ radians, where N is the number of primary colors. As described in greater detail below, each color section is a different color filter, which preferably has a separate ND filter. The ND filter does not affect the spectral content of the filtered light, but rather alters the intensity of the filtered light over the entire spectrum.

Figure 4B:
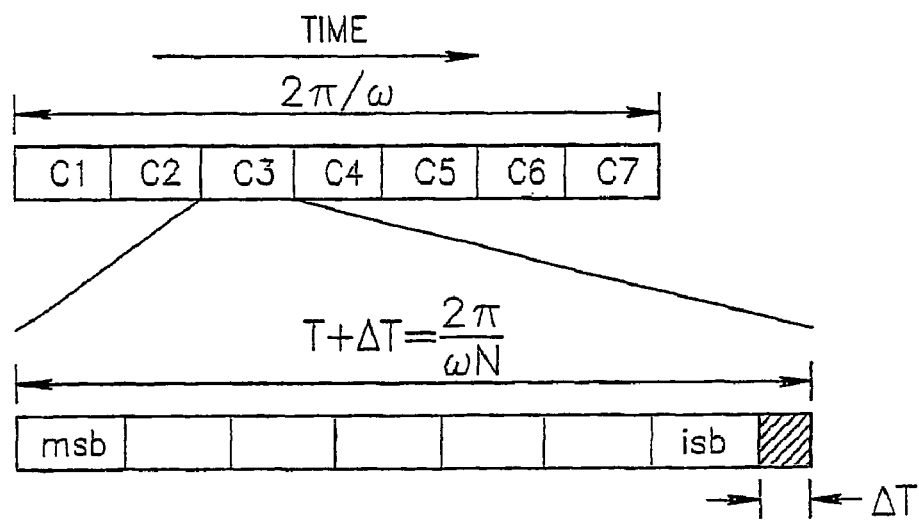
Figure 4C:
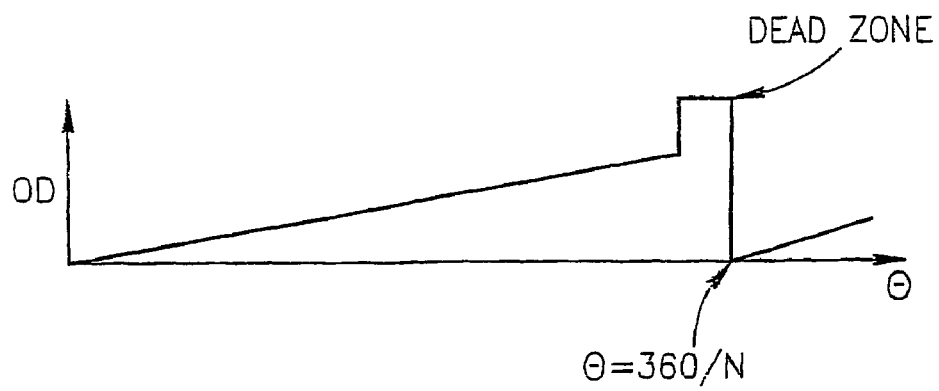

The timing sequence for operation of color filter wheel 82 is depicted in FIG. 4B. The duration of a full rotation of the color filter wheel is $2\pi/\omega$, each color section has a time slot of $2\pi/\omega N$, during which m bit planes are loaded into the spatially modulated mask. Each bit plane occupies equal time duration and at after the last significant bit loading, a dead zone exists. To achieve the correct dependence between light intensity and the corresponding bit value, a continuously varying ND filter is placed in each color section of filter 82. The density of the ND filter varies linearly with $\theta$? from zero density to a density of $m \cdot \log_{10} 2 \approx 0.3$ m, m being the number of bits/channel, as shown in FIG. 4C. In the transition region (the dead zone), from the least significant bit (lsb) of one color to the most significant bit (msb) of the next color the density increases to a higher value to avoid color mixing. As shown below, this design ensures that the brightness of light deflected from i-bit plane has an almost linear dependence on the value of $i^{th}$ bit. A gamma-correction look-up table (LUT) compensates the remaining non-linearity as explained above.

The light intensity which passes through the ND filter, during the period of the $i^{th}$ bit (msb=0 bit, lsb=m−1 bit) is given by:

$$\frac{I_{AVG}(i)}{I_0} = \frac{1}{T+\Delta T}\int_{\frac{iT}{m}}^{(i+1)\frac{T}{m}} 10^{-\frac{0.3mt}{T}} dt$$

$$= \frac{T}{0.3m\ln 10(T+\Delta T)}10^{-0.3i}(1-10^{-0.3})$$

$$= \frac{1/2}{m\ln 2(1+\Delta T/T)}\frac{1}{2^i}$$

Here T+ΔT is the duration of color section, where ΔT is the time of the dead zone. It is evident that the ratio between the average intensities in two following bits is indeed 2. A similar relationship is also obtained when the ND filter has a density of 0.22 during the msb period, after which the density increases linearly from zero to 0.3(m−1), while the timing sequence stays the same.

Other optional implementations for varying the brightness of the light are also possible and are encompassed within the scope of the present invention. For example, a varying wheel of neutral density filters could optionally be placed after the color filter wheel. This ND filter wheel would rotate synchronously with the color filter wheel, so that the ND filter wheel completes seven turns during one turn of the color wheel.

Another optional implementation would use an electronically controlled LC or Electro-optic light intensity modulator after the color filter wheel. Such a device controls the brightness of the filtered light through an electronic (digital) control. One example of such a device is the LC modulator from CRL Opto (United Kingdom). As another option, an electronic shutter system could be placed as an aperture controlling the amount of light arriving to the SLM, or passing from the SLM to the screen.

The intensity of the light source could also optionally be altered, by modulating it in time. For example, the light source could optionally be implemented as a flash lamp, which emits light in bursts or "fashes." The light then decays with time, such that the brightness of the light decreases over time. This decrease enables the intensity or brightness of the light to be altered without a neutral density filter. Alternatively, in a similar system with a flash lamp, the lamp could optionally also emit flashes of light with a high repetition rate, such that the number of pulses per unit of time would determine the brightness of the emitted light.

Figure 5A:
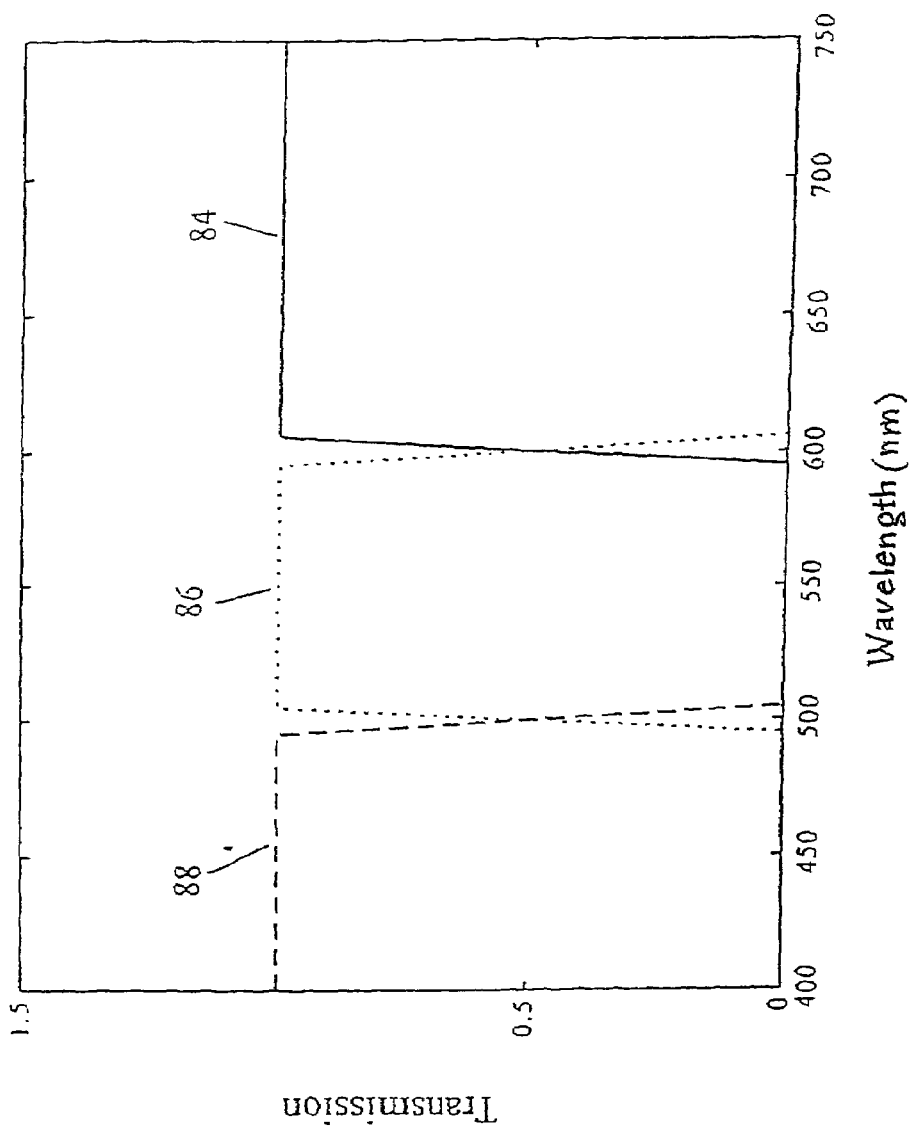
FIGS. 5A and 5B illustrate the different spectra of a typical RGB background art system (FIG. 5A) and of an exemplary implementation according to an embodiment of the present invention with six colors (FIG. 5B)
Figure 5B:
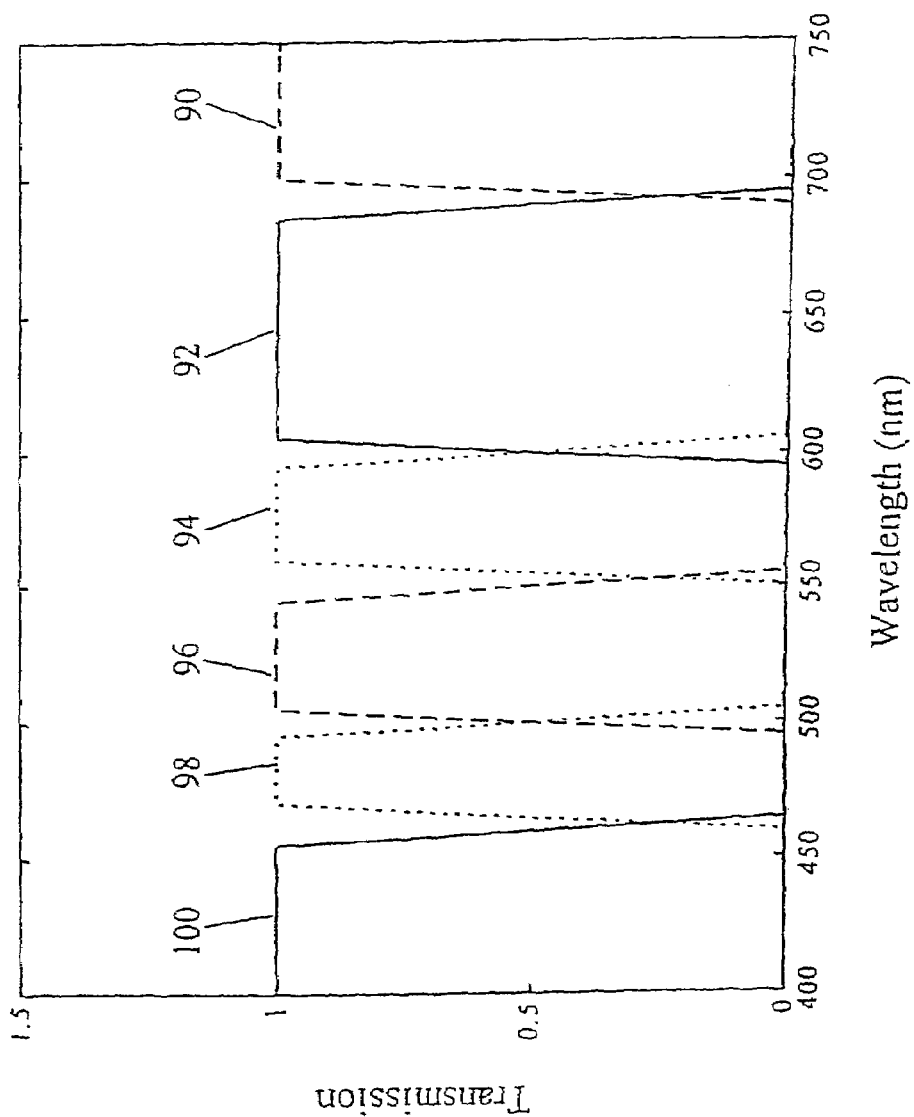

FIGS. 5A and 5B show transmission spectra for the background art RGB system (FIG. 5A) and for an exemplary color system according to the present invention with six colors (FIG. 5B). As shown in FIG. 5A, the transmission spectra of RGB filters, shown as spectra 84 (red), 86 (green) and 88 (blue), are limited and cannot provide wide coverage for the gamut of colors desired to be displayed. FIG. 5B shows the transmission spectra of the six color system shown as spectra 90, 92, 94, 96, 98, and 100. These spectra are obtained by halving the spectral range of each of the RGB filters with spectra as show in FIG. 5A. The pair of filters 90 and 92 cover the same spectral range of the wider filter 70, and so forth, thereby increasing the possible gamut of colors which can be covered. The selection of the number of primary colors is preferably performed according to a balance between the desirability of adding more primary colors, which increases the possible gamut of displayable colors, and the increased complexity of adding more colors.

Figure 2:
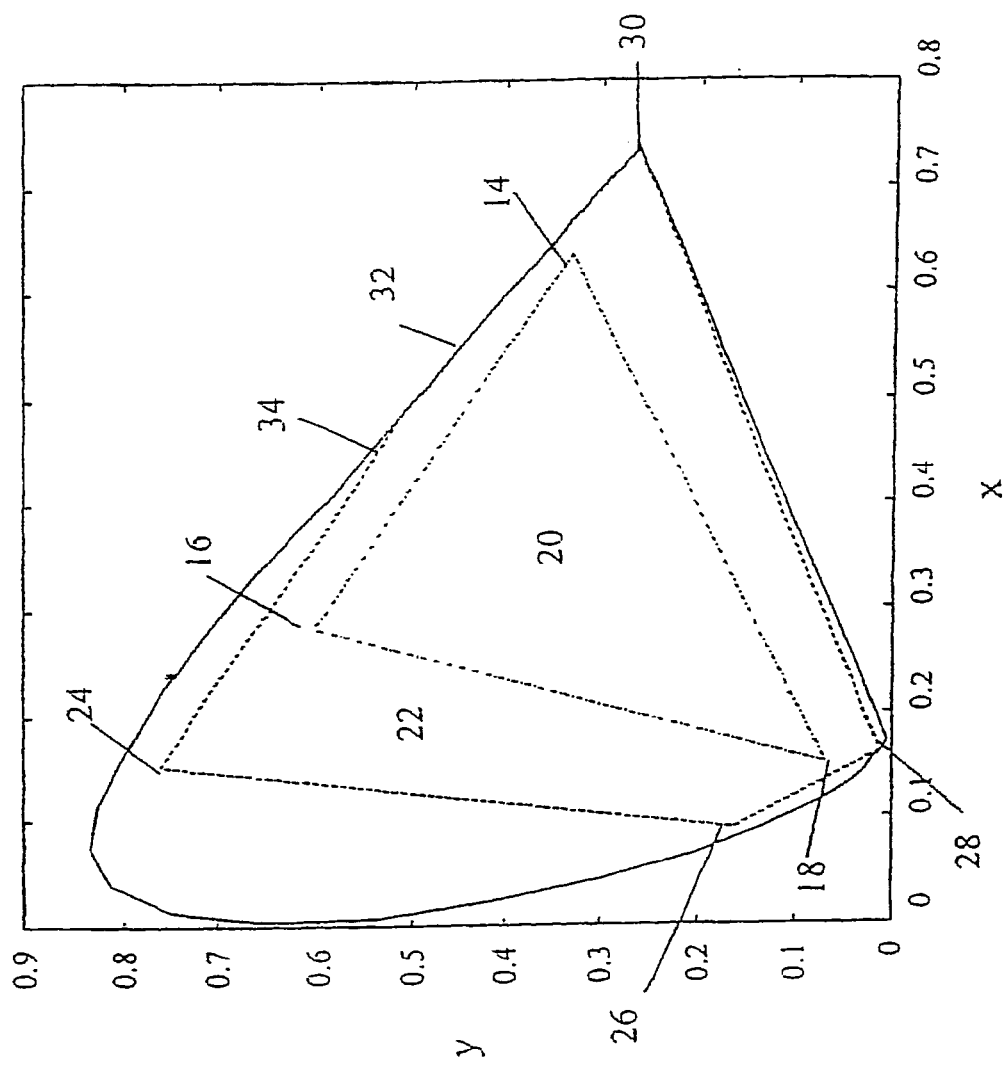
FIG. 2 is a chromaticity diagram showing a color gamut for a typical phosphor set according to the background art and also showing an exemplary expanded color gamut according to an embodiment of the present invention.

The spectra of FIG. 5A correspond to hexagon 22 (not shown, see FIG. 2), with points 24, 26, 28, 30, 32 and 34, which shows the increased size of the gamut of colors provided by more than four colors, as compared to the gamut produced by RGB phosphors (triangle 20 of FIG. 2).

Figure 6A:
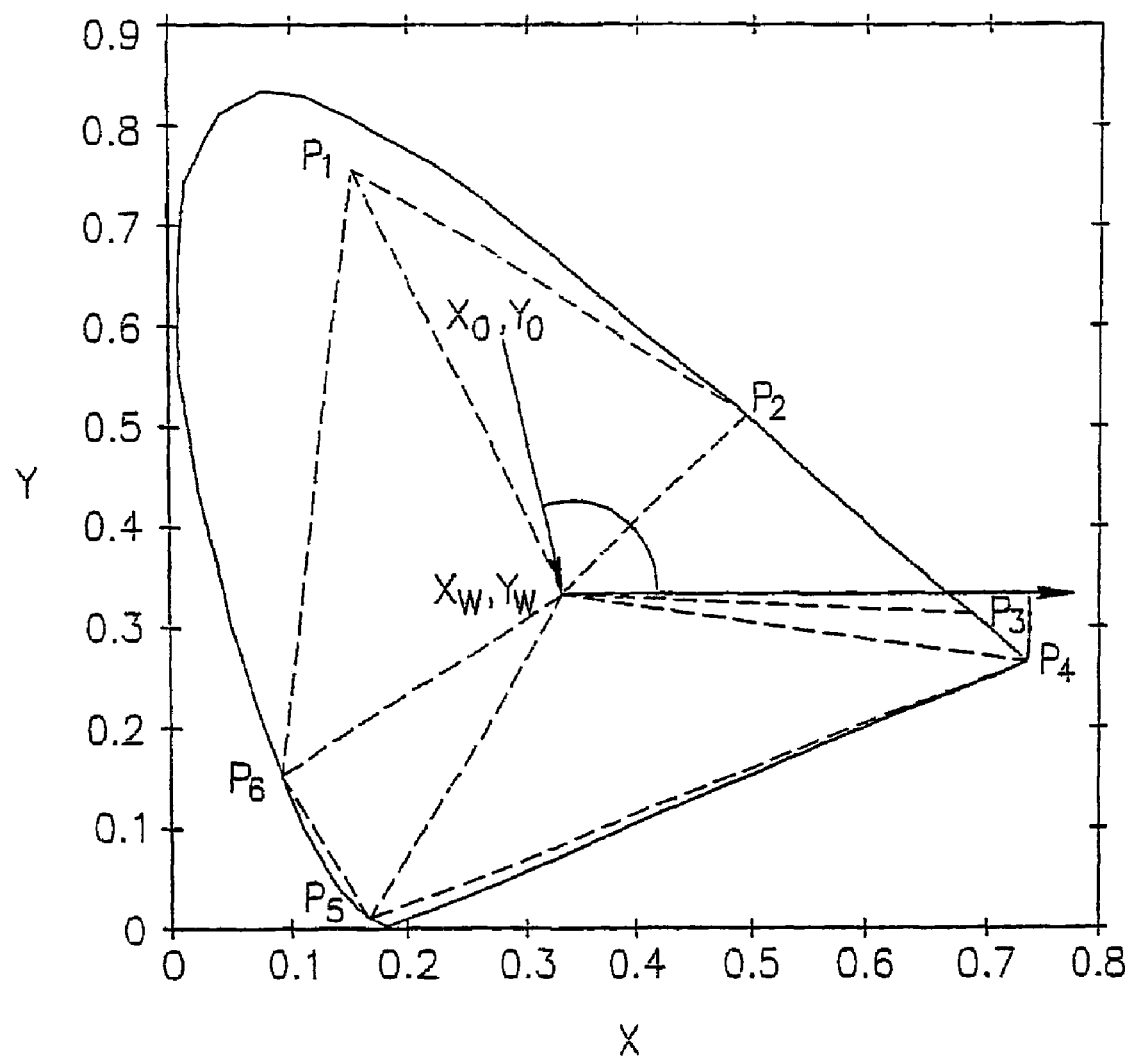
FIG. 6 illustrates a method for converting image data from the background art three-color RGB format to an exemplary format according to an embodiment of the present invention.

However, most electronic image data is typically given in an RGB or RGB related format, according to some function of the RGB format, or in another format such as YCC-type data. In an exemplary embodiment, the use of such data requires the data to be transformed into a format which is suitable for a display including at least four primaries. Optional methods for such data transformation is described with respect to FIGS. 6A and 6B and in FIG. 7. For the purposes of description only and without any intention of being limiting, a six plus one color implementation of the system of the present invention is used, with six primary colors and a white light source defined by $(x_w, y_w)$. The white light source is preferably produced by a combination of the six primaries. In an alternate embodiment, the white source may be produced by a separate white filter or light producing device. This arrangement creates six triangles in the color gamut of the display. In alternate embodiments the point used to produce triangular regions need not be white or substantially white.

Figure 6B:
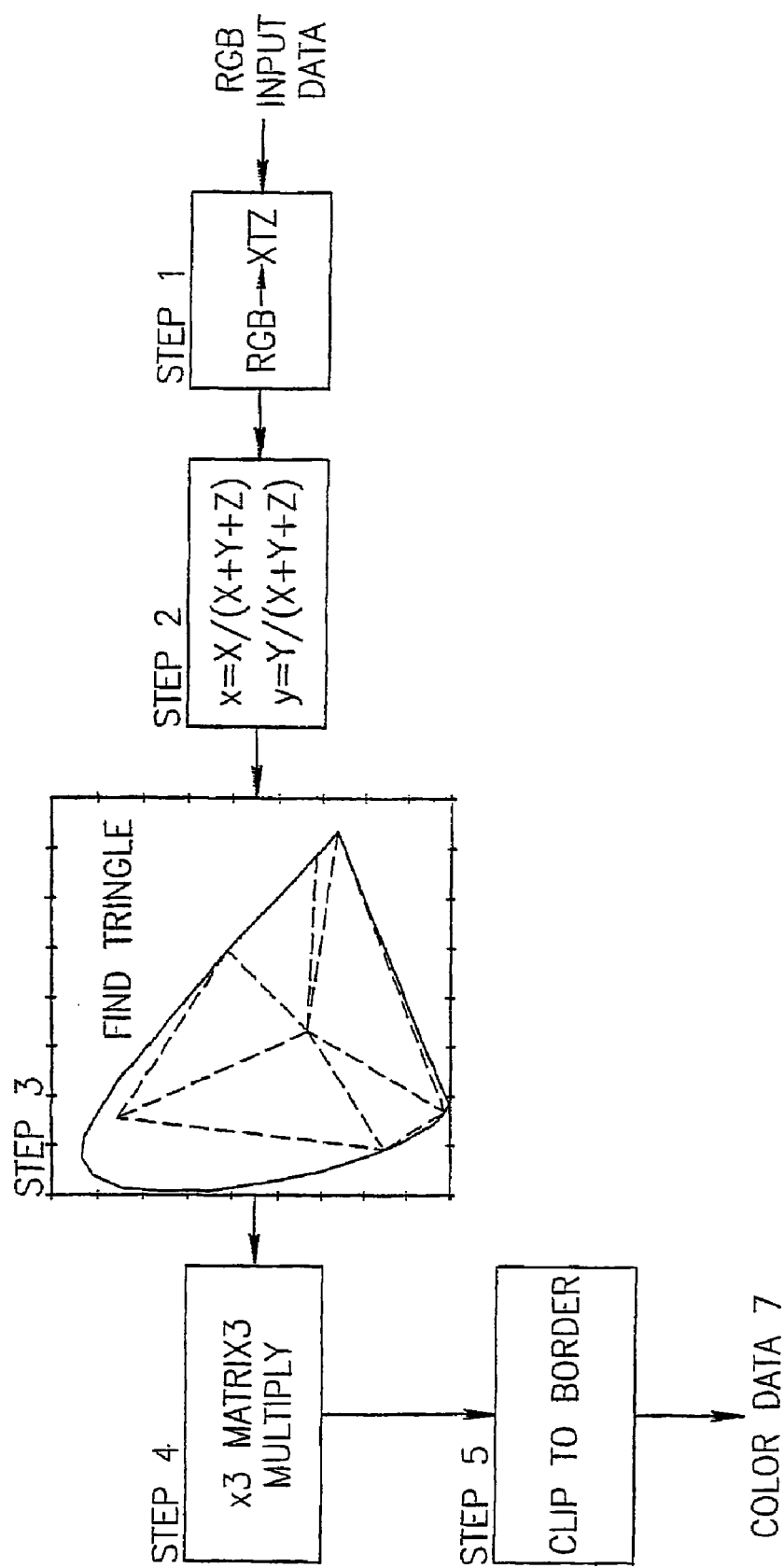

As explained with regard to the exemplary method in the flowchart of FIG. 6b, a signal such as a or YCC-type or RGB signal arriving as input is preferably transformed into XYZ coordinate space in step 1, by using a 3×3 matrix transformation as well known in the art. The projection of this color to an input point on the x-y cromaticity plane is calculated from the XYZ coordinates in step 2. The position of the input point $(x_0, y_0)$ lies within one of the sectors as shown in FIG. 6B. To determine in which sector the input point $(x_0, y_0)$ appears, the angle of the point $(x_0, y_0)$ with respect to a reference primary, such as the most reddish primary, is calculated, taking the white point representing the white source as an origin in step 3:

$$\phi = \phi_0 + \phi_R = tg^{-1}[(y_0-y_w)/(x_0-x_w)] - tg^{-1}[(y_R-y_w)/(x_R-x_w)]$$

where the sign of the tangent is determined by comparing the relevant y coordinate with $y_w$. After determining the angle ϕ, it is compared with the angles $\phi_i$ (i=1–6) of all primaries to determine in which sector the input data point appears. After this is calculated, the three colors at the triangle corners (namely, the white and two out of the six other colors which are at the corners of the relevant triangle, in this example $p_1$ and $p_2$) are used to create the additive linear combination representing the input data:

$$\begin{pmatrix} X_0 \\ Y_0 \\ Z_0 \end{pmatrix} = \alpha_w \begin{pmatrix} X_w \\ Y_w \\ Z_w \end{pmatrix} + \alpha_1 \begin{pmatrix} X_1 \\ Y_1 \\ Z_1 \end{pmatrix} + \alpha_2 \begin{pmatrix} X_2 \\ Y_2 \\ Z_2 \end{pmatrix}$$

In step 4, the parameters ($a_w$, $a_1$, $a_2$) of the combination are given by:

$$\begin{pmatrix} a_w \\ a_1 \\ a_2 \end{pmatrix} = \begin{pmatrix} X_W & X_1 & X_2 \\ Y_W & Y_1 & Y_2 \\ Z_W & Z_1 & Z_2 \end{pmatrix}^{-1} \begin{pmatrix} X_0 \\ Y_0 \\ Z_0 \end{pmatrix}$$

The additive linear combination is solved for the constants $a_w$, $a_1$, and $a_2$.

The XYZ matrix can be inverted if the three primary vectors do not lie on the same plane. If one of the parameters ($a_w$, $a_1$, $a_2$) is negative, the input point lies outside the gamut, in step 5. In this case the negative value can be set to zero. These steps produce the resultant seven color (six color plus white light for brightness) data.

The parameters $a_1$ and $a_2$ represent constants for the two non-white primaries defining the outside leg of the relevant triangle. The constants $a_1$ and $a_2$ represent the levels at which the primaries corresponding to these constants should be displayed to reproduce the color represented by the input point ($x_0$, $y_0$). Each of the six primaries $p_1$–$p_6$ contribute to the white source defined by ($x_w$, $y_w$) according to certain pre-defined levels, as the white source is formed from certain proportions of each of these primaries. To determine the constants $a_3$, $a_4$, $a_5$, and $a_6$, which determine the levels of the four primaries not part of the relevant triangle, the contribution level of the primaries corresponding to these constants to the white source ($x_w$, $y_w$) are multiplied by the constant $a_w$. For example, if the primary corresponding to constant $a_3$ contributes 0.25 (on a 0–1 scale) to the white source, 0.25 is multiplied by $a_w$ to determine $a_3$. Since, in one embodiment, the two non-white primaries forming the relevant triangle also contribute to the white source, an additional two levels are determined for these primaries based on their contribution to the white source and on the level $a_w$, and these two levels are added to $a_1$ and $a_2$ to calculate the contribution of these two constants towards producing the input point color corresponding to the input point ($x_0$, $y_0$).

In another embodiment, one white source ($x_w$, $y_w$) may be chosen for the purpose of forming triangular spectral regions with the six non-white primaries placed along the periphery of the horseshoe, and another set of sources $w_1$–$w_6$ (one for each pair of adjacent non-white primaries) may be used to calculate the contribution of the non-white primaries towards reproducing the color represented by the input point. The sources $w_1$–$w_6$ need not be substantially white. In alternate embodiments the color or colors used as central points need not be white or substantially white.

Figure 7:
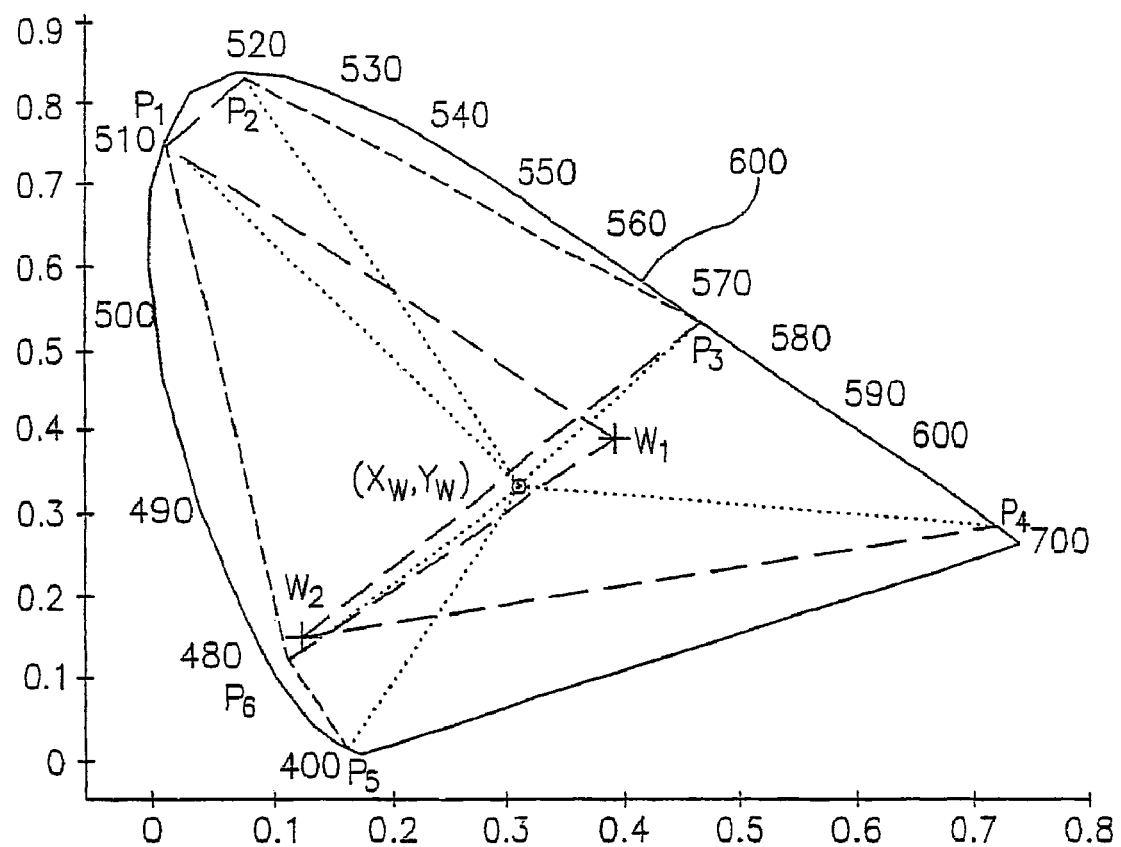
FIG. 7 depicts a chromaticity mapping for converting source data to calculate the contribution levels of primaries according to an embodiment of the present invention.

FIG. 7 depicts a chromaticity mapping for converting source data to calculate the contribution levels of primaries according to an embodiment of the present invention. Referring to FIG. 7, the horseshoe 600 includes primaries $p_1$–$p_6$, white source ($x_w$, $y_w$) and sources $w_1$–$w_6$ (for clarity only sources $w_1$ and $w_2$ are depicted). Source $w_1$ corresponds to the pair of adjacent primaries $p_1$ and $p_6$ and forms a triangular region with these primaries. Source $w_2$ corresponds to the pair of adjacent primaries $p_3$ and $p_4$ and forms a triangular region with these primaries.

First, the input point ($x_0$, $y_0$) representing the target color is mapped on the space 600, and the relevant triangle, defined by the white source ($x_w$, $y_w$) and two non-white primaries is found, as described above. Next, a second source $w_\beta$ from $w_1$–$w_6$ is referred to, the relevant source being that formed from the six non-white primaries, with the exclusion of the two non-white primaries firming the outside leg of the relevant triangle. Preferably, the second source $w_\beta$ and the two non-white primaries forming the outside leg of the relevant triangle form a second triangle which substantially overlaps the relevant triangle. This relevant source $w_\beta$ is used along with the two relevant non-white primaries in an additive linear combination similar to that described above:

$$\begin{pmatrix} X_0 \\ Y_0 \\ Z_0 \end{pmatrix} = a_{w\beta} \begin{pmatrix} X_{W\beta} \\ Y_{W\beta} \\ Z_{W\beta} \end{pmatrix} + a_1 \begin{pmatrix} X_1 \\ Y_1 \\ Z_1 \end{pmatrix} + a_2 \begin{pmatrix} X_2 \\ Y_2 \\ Z_2 \end{pmatrix}$$

The parameters ($a_{w\beta}$, $a_1$, $a_2$) of the combination are given by:

$$\begin{pmatrix} a_{W\beta} \\ a_1 \\ a_2 \end{pmatrix} = \begin{pmatrix} X_{W\beta} & X_1 & X_2 \\ Y_{W\beta} & Y_1 & Y_2 \\ Z_{W\beta} & Z_1 & Z_2 \end{pmatrix}^{-1} \begin{pmatrix} X_0 \\ Y_0 \\ Z_0 \end{pmatrix}$$

The additive linear combination is solved for the constants $a_{w\beta}$, $a_1$, and $a_2$.

The parameters $a_1$ and $a_2$ represent constants for the two non-white primaries defining the outside leg of the relevant triangle. The constants $a_1$ and $a_2$ are the levels at which these constants may be displayed (e.g., projected onto a screen or displayed via an LCD) to reproduce the color represented by the input point ($x_0$, $y_0$). Each of the remaining four non-white primaries (the six non-white primaries not including the two relevant non-white primaries) contribute to the relevant source $w_\beta$ from $w_1$–$w_6$ according to certain pre-defined levels, as the relevant source is formed from certain proportions of each of these remaining primaries. Thus, to determine the constants $a_3$, $a_4$, $a_5$, and $a_6$, the contribution levels of the primaries corresponding to these constants to the relevant source $w_\beta$ are multiplied by the constant $a_{w\beta}$. Since, in such an embodiment, the two non-white primaries forming the relevant triangle do not contribute to the relevant source, no additional calculation needs to be performed to calculate the contribution of these two constants.

While, in the above description, the methods are described with respect to six primaries, the above described methods may be used to transform a color point to a color system including any number of primary colors. Furthermore, in alternate embodiments, other sets of steps may be used to calculate the levels for a set of primaries using a set of triangular regions formed by pairs of the primaries and central points.

The set of steps above is preferably carried out by a processor or data converter which is part of a display system according to an exemplary embodiment of the present invention. Such a processor or data converter may be any conventional data processing device, such as a microprocessor, "computer on a chip," or graphics processor.

The method described above is only one possible way to transform the RGB data to a format suitable for a display with at least four colors. In particular, regarding the detailed procedure, it is not essential to include white light points among the color points. The procedure only requires the definition of a set of triangles, which are based on the existing primaries and any set of additional colors, which preferably can be composed from the other primaries. For example, the source or white color point could be replaced with a definition of the source or white point as being composed of equal amounts of each of the six primaries.

Figure 8:
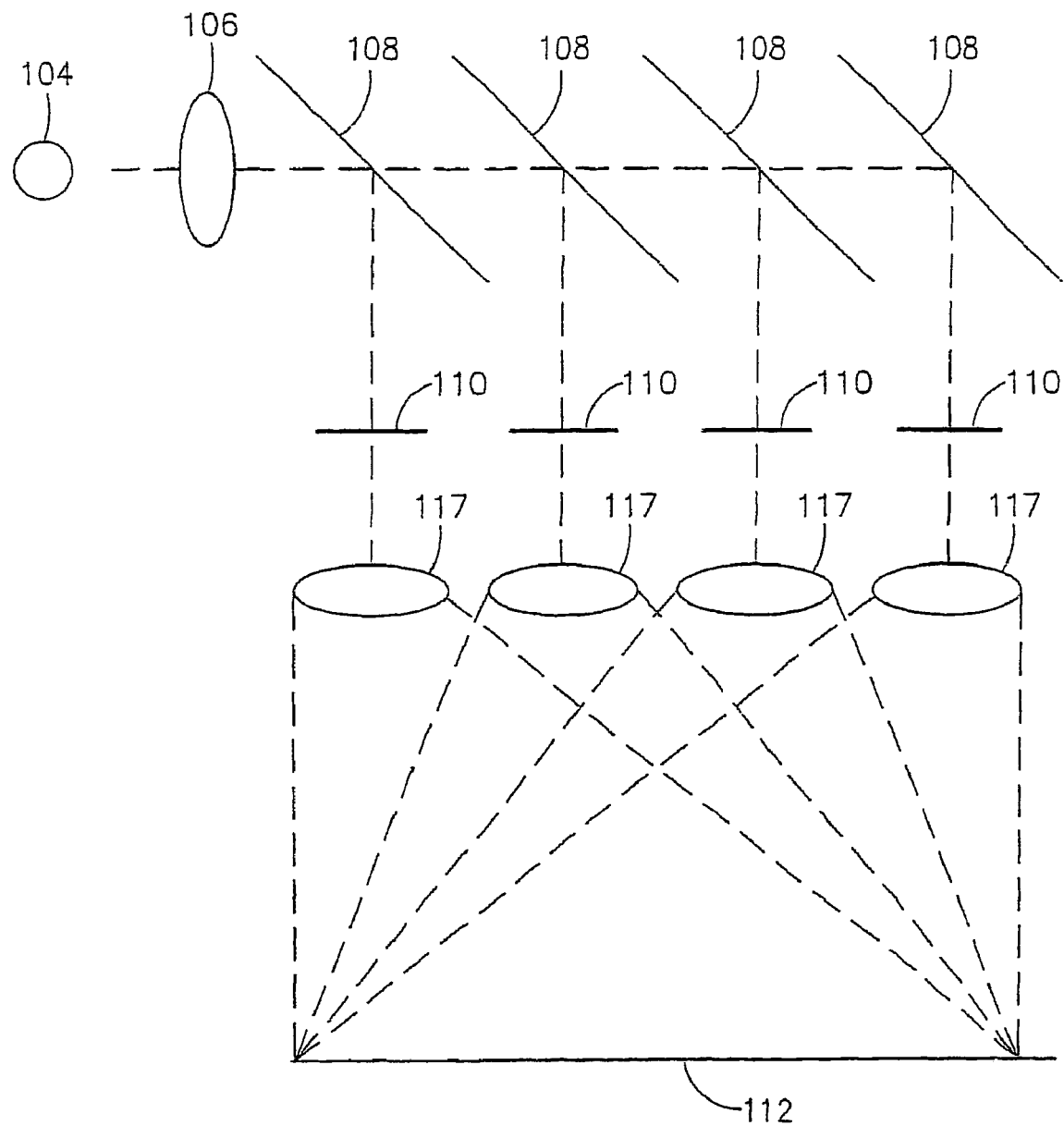
FIG. 8, depicts one embodiment of the system of the present invention is preferably based upon a simultaneous projection scheme.

As shown with regard to FIG. 8, another optional embodiment of the system of the present invention is preferably based upon a simultaneous projection scheme. In a system 102, a white light source 104 produces a white light beam. The light beam is passed through a collimating lens 106 for collecting and focusing the light. Next, the light is passed through a plurality of dichroic mirrors 108. Preferably, one dichroic mirror 108 is used for each desired primary color. Four such dichroic mirrors 108 are shown for the purposes of description only and without any intention of being limiting. Each dichroic mirror 108 passes part of the light spectrum and reflects the remaining part of the light spectrum, thereby acting as a filter to produce light of each desired primary color.

Next, a plurality of SLM (spatial light modulators) 110 is used. Each SLM 110 is then used to modulate each of the beams according to the data of the image which is to be produced. The beams may optionally be combined before projection, but preferably are projected on a display screen 112, as shown. For the latter implementation, the beams are combined at display screen 112. The integration of beams is performed on display screen 112 simultaneously.

Optionally and more preferably, each SLM 110 has an associated imaging lens 114 for focussing the beam on display screen 112 as the beam passes through SLM 110. Each imaging lens 114 is preferably positioned away from the axis of the beam of light after passing through SLM 110, such that that combined beams of light appear to be in registration on display screen 112. Alternatively, mirrors could optionally be used for placing the beams of light in registration, and/or the angle of each SLM 110 could optionally be adjusted in order to adjust the angle of the beam of light as it exits each SLM 110.

According to another embodiment, the light from the white light source is split into a plurality of beams. The beam splitting can optionally be performed by dispersing the light through a prism/grid and collecting the relevant parts of the spectrum. Alternatively, the white light can be split without dispersion into a plurality of beams, after which each beam is filtered to create each of the relevant colors. Also alternatively, a suitable arrangement of dichroic mirrors/filters may optionally be used.

A similar implementation is optionally and preferably based on seven CRT (cathode ray-tubes) with suitable phosphors or black-and-white CRT with suitable filters that are projected onto a screen and combined there in registration as in three-primary CRT (cathode-ray tube) projectors (for example, Reality 800 series of products from Barco Inc.).

Figure 9:
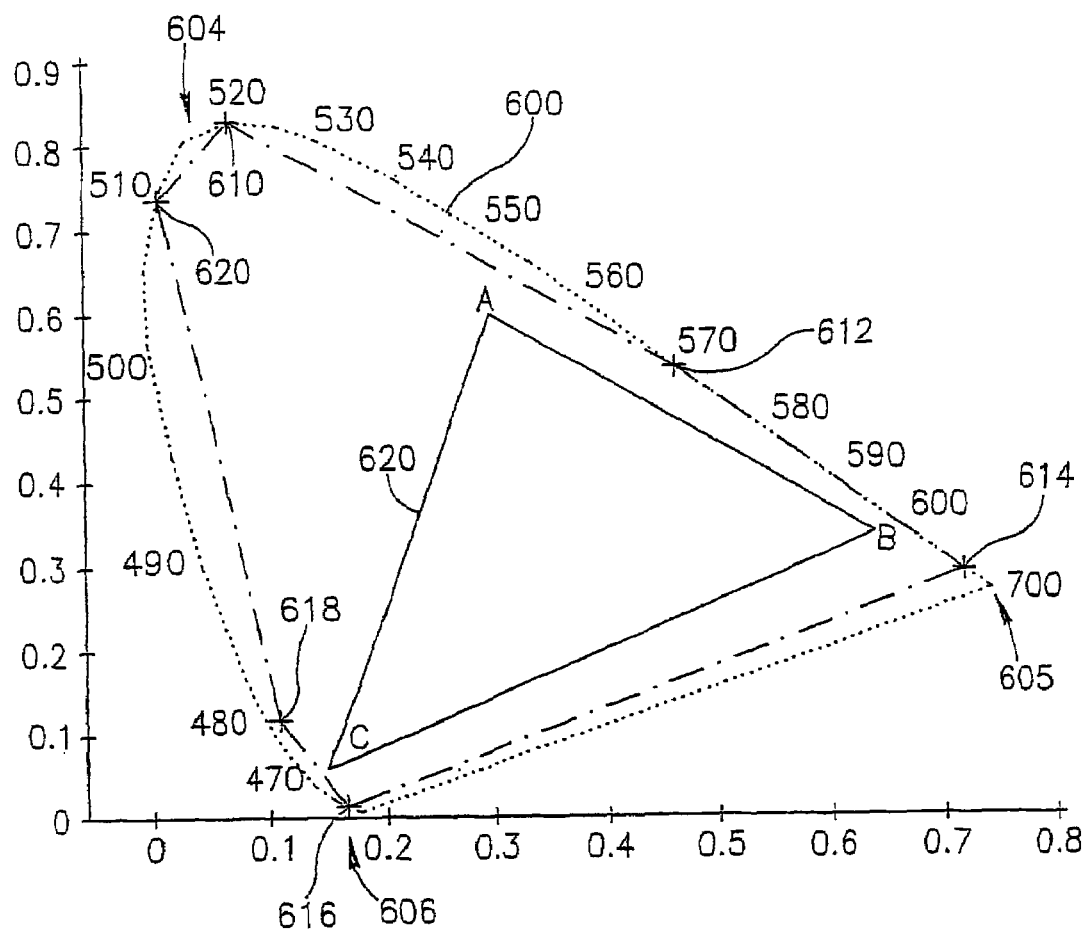
FIG. 9 is a chart depicting the chromaticity for a set of filters for use with a display system according to one embodiment of the present invention.

In one embodiment of the present invention, a set of filters is chosen to gain the widest chromatic coverage possible while maintaining white balance, efficiency and brightness. FIG. 9 is a chart depicting the chromaticity for a set of filters for use with a display system according to one embodiment of the present invention. Referring to FIG. 9, the horseshoe 600 represents the gamut generally viewable by humans, and thus the gamut which it is desirable to reproduce in a display. Triangle 602 represents the typical range of a prior art display, using primaries described by the points a, b and c. A more accurate and true color display, having a wider chromatic coverage, may be achieved by using, for example, primaries described by the points 610, 612, 614, 616, 618 and 620. Such a set of primaries may be chosen in order to increase the coverage in the chromaticity, to provide maximal brightness and efficiency, and to allow for white to be produced by a simple summation, preferably in equal proportions, of the primaries, rather than by a combination using unequal proportions of the primaries.

In one embodiment of the present invention, a set of filters is chosen based on the principle that, to obtain a wide coverage of the chromatic gamut, for each of the corners 604, 605 and 606 of the horseshoe 600, at least one primary should be chosen to fall near a corner 604, 605 or 606. In one embodiment of the present invention, a set of at least three primaries is chosen, such that at the filters for at least three primaries in the set have the following characteristics: one filter does not pass wavelengths substantially below 600 nm, another does not pass wavelengths substantially above 450 nm, and the third is a narrow band-pass filter with a central wavelength in the range of approximately 500–550 nm, whose total width does not substantially exceed 100 nm. Additional primaries may be chosen to increase the number of colors which can be represented, beyond the triangle created by the three filters, to increase the brightness and efficiency, and to allow for white balance.

Figure 10:
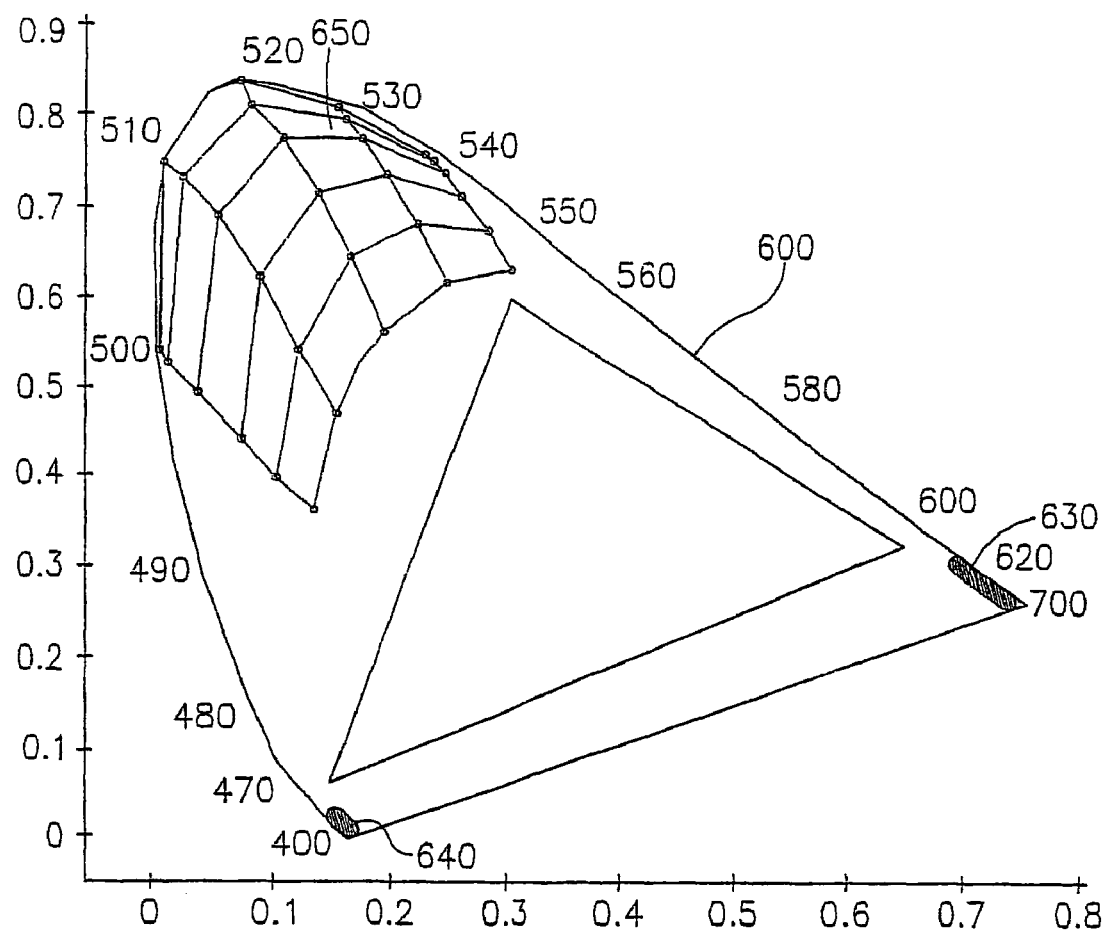
FIG. 10 is a chart depicting the chromaticity ranges from which a set of filters may be chosen for use with a display system according to one embodiment of the present invention.

FIG. 10 is a chart depicting the chromaticity ranges from which a set of filters may be chosen for use with a display system according to one embodiment of the present invention. The chromaticity ranges depicted in FIG. 10 are meant to be used with D65 illumination; other types of illumination may be used. Referring to FIG. 10, the horseshoe 600 represents the gamut generally viewable by humans. The region 630 represents chromaticity region corresponding to a set of filters which may be chosen that do not pass wavelengths substantially below 600 nm. The region 640 represents chromaticity region corresponding to a set of filters which may be chosen that do not pass wavelengths which are substantially above 450 nm. The region 650 represents a chromaticity region corresponding to a set of filters, where the filters are represent band-pass filters which pass a band of wavelengths centered on points ranging from approximately 500 to 550 nm and having a width of not substantially more than 100 nm. In one embodiment, a set of primaries for a display system are chosen such that each of at least three of the set of primaries is in one of regions 630, 640 and 650. For a given region 630, 640 or 650, more than one primary may be chosen having wavelengths substantially in regions 630, 640 and 650.

Referring to FIG. 9, primaries 610, 614, 616 and 620 are chosen from the chromaticity regions shown in FIG. 10. Primaries 612 and 618 are chosen to increase gamut coverage and to aid in producing white balance and for efficiency and brightness.

Figure 11:
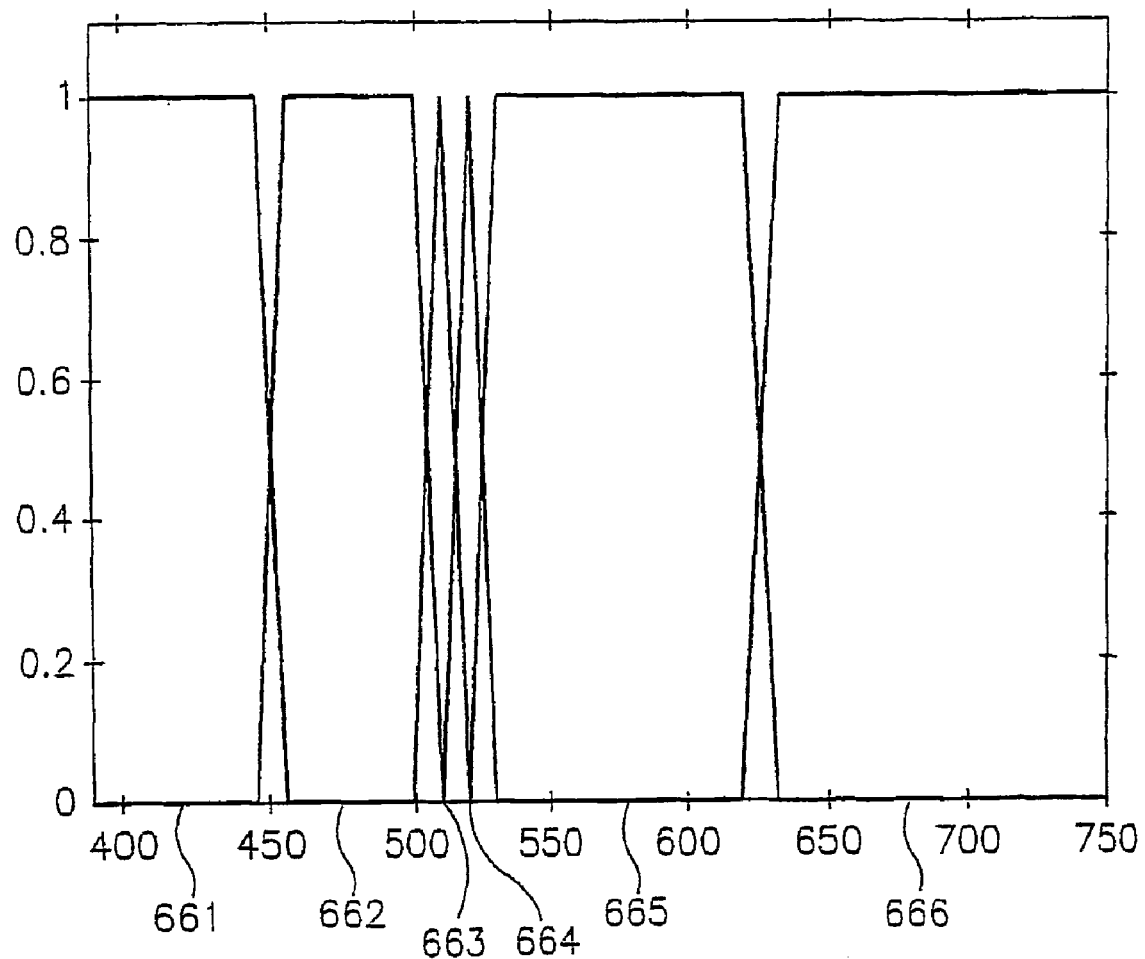
FIG. 11 is a graph of the transmission spectra of filters producing the set of primaries depicted in FIG. 8.

FIG. 11 is a graph a graph of the transmission spectra of filters producing the set of primaries depicted in FIG. 9. Referring to FIG. 11, a first filter passes wavelengths in the range 661, and corresponds to the primary 616 in FIG. 9. This filter corresponds to a primary chosen from the region 640 in FIG. 10. A second filter passes wavelengths in the range 662, and corresponds to the primary 618 in FIG. 9. A third filter passes wavelengths in the range 663, and corresponds to the primary 620 in FIG. 9. This filter corresponds to a primary chosen from the region 650 in FIG. 10. A fourth filter passes wavelengths in the range 664, and corresponds to the primary 610 in FIG. 9. This filter corresponds to a primary chosen from the region 650 in FIG. 10. A filter filter passes wavelengths in the range 665, and corresponds to the primary 612 in FIG. 9. A sixth filter passes wavelengths in the range 666, and corresponds to the primary 614 in FIG. 9. This filter corresponds to a primary chosen from the region 630 in FIG. 10.

In alternate embodiments, other combinations of primaries and filters may be used which include the three primaries from the ranges discussed above. For example, the three primary colors from the ranges discussed above may be used in combination with only one addition primary color from outside these ranges.

In one embodiment of the present invention, a set of primaries and filters is chosen so that a spectral reconstruction of certain set of colors is obtained. When reproducing "real" or "natural" colors for human viewing using a finite set of primaries, a certain target color to be reproduced may be reproduced by different sets of levels or combinations of the set of primaries. Many different spectra may be represented by the same target color coordinates, a phenomenon named metamerism. Representing a target color using a set of primaries based on an "average" human observer's reaction to a set of primary colors is inaccurate, as an actual human observer is unlikely to perceive the representation of the target color as matching the actual target color.

In the prior art, the spectra of primary colors for display and other systems (such as printing systems) has been chosen based on a calorimetric match. In a calorimetric match, a series of human subjects are shown a color patch created using a combination of three of primaries. Each subject is shown two patches; a target color patch and a patch created from a mix of three primaries. The level of each primary is adjusted until the subject reports that the target patch and primary patch are identical. The primary levels are recorded, and the process is repeated for a series of other target colors. For each target color, the levels across the set of human subjects are averaged. The resulting set of averaged levels is used as a model for reproducing the target colors. Forming color via calorimetric analysis results in inaccuracies in people's perceptions of colors produced by the resulting displays, as each person perceives color differently. A person viewing a display using primaries produced through colorimetric matching is unlikely to perceive colors as do the "average" humans used to create the primary spectra, and thus is likely to perceive different colors than intended.

In order to increase the accuracy of colors represented by a set of primaries, and to increase the likelihood that different human observers will perceive certain colors accurately, one embodiment of the system and method of the present invention is used to choose and define a set of primaries based on a spectral match rather than a colorimetric match, such a set of primaries may be used in a display system according to an embodiment of the present invention. A set of primary colors are chosen so that they most accurately reproduce a set of actual spectrum samples.

In one embodiment, to choose a set of l primaries for use, for example, in a display system, a target set of spectra to be reproduced are chosen, and a set of l primaries are chosen which optimally reproduce the set of target spectra. While the set of l primaries are used to reproduce a broad set of visible spectra, it is desired that the target set of spectra in particular be reproduced as accurately as possible. The set of target spectra may be chosen for use with a certain application; for example, color film reproduction.

For example, in order choose a set of l primaries (where, for example, l=6) for use with a color display optimized to reproduce the color spectra of a certain type of color film, a set of m sample spectra produced by the color film itself are selected, and l primaries are created which optimally produce the desired color spectra. In color film, light is passed through layers of cyan, magenta and yellow dyes. The concentrations of the dyes determine the transmission spectrum of the film. The concentrations are measured as red, green and blue densities for the cyan, magenta and yellow dyes, respectively. The concentrations are varied according to the exposure of the film; i.e., according to the color spectra falling on the film during exposure. In one embodiment, a set of sample transmission spectra which are typical for films are chosen, and a set of l filters or primaries are selected such that for each of the given sample transmission spectra, a color can be produced which substantially simulates the sample spectrum. Preferably, each sample spectra is associated with the dye densities producing the spectrum, allowing for source data corresponding to the dye densities to be easily converted to primary levels in a display system.

The m sample spectra may be chosen based on certain constraints, or with certain goals in mind. For example, the sample spectra may include colors such as "memory colors," colors which may be easily perceived by human observers as incorrectly reproduced. Memory colors may include, for example, skin tones or the color of grass. If a display inaccurately reproduces skin tones, a human observer is more likely to notice the inaccuracy than if a display inaccurately reproduces, for example, the colors of a set of balloons. The sample spectra may include samples from photographs or films of actual objects. The sample spectra may include a broad range of hues with different saturation and brightness levels for each hue.

To determine the spectra of the primaries and the number of the primaries, the m target spectra chosen are sampled at a certain number n of sample wavelengths. The measured spectra are sampled at certain wavelengths at the desired resolution. For example, the spectra may be sampled across the range 400–700 nm with a 10 nm resolution, giving 31 sample points for each spectrum. Each continuous sample spectrum is thus converted to a vector in an n—dimensional space; in the example given n=31. Each of the m vectors $\underline{S}_i(\lambda)$, i=1. . . m and $\lambda$=1. . . n (n=31 in the example) is an ordered set of n numbers each preferably between 0 and 1. Each number represents the sampled spectral value at the corresponding wavelength $\lambda$ across the range of 400–700 nm. The spectra of all patches are arranged in an m×n matrix $S_{i\lambda,???}$ preferably m>>n where m is the number of spectra sampled and n is the number of sample points for each spectrum.

To find a set of l primaries which can reproduce the sample spectra with some accuracy, the set of n basis vectors $\underline{\Psi}_j(\lambda)$ l<<n, preferably l<<n, is found which span the same sub-space which is spanned by the m sample vectors, such that $\|\underline{S}_i(\lambda) - \Sigma_j \alpha_{ij} \underline{\Psi}_j(\lambda)\|$ is near zero for all m vectors. Here $\|x\|$ is the norm of the vector $\underline{x}$. Each basis vector is a spectrum having n sample points which may be used to create, for example, a primary color or a filter for a primary color. A primary or filter may correspond to a basis vector, in that a basis vector may provide a spectral model for forming a primary or filter. The basis vector may be modified in any number of ways to create a spectrum for a filter; for example, the basis vector may be rotated, or its constants may be transformed according to various methods.

The m sample vectors may be converted to the n basis vectors using various methods. In an exemplary embodiment, a subset of l basis vectors from the n basis vectors is chosen, such that the subset includes those basis vectors most contributing to reproducing the m sample spectra. Preferably, a process similar to factor analysis is used to eliminate any negative values, and the resulting l basis vectors are rotated. Also preferably, further requirements are that the coefficients $0 \le \alpha_{ij} \le 1$, and that $0 \le \underline{\Psi}_j(\lambda) \le 1$ for all i, l and $\lambda$.

In one embodiment, the known singular value decomposition (SVD) method is used. Preferably, the m×n matrix $S=S_{i\lambda}$ matrix, preferably m>>n, is decomposed into three matrixes, such as S=VWU, where V is an m×n matrix W is an m×n diagonal matrix, and U is an m×n orthogonal matrix.

The decomposition may be written as:

$$S_{i\lambda} = \sum_k w_k V_{ik} U_{k\lambda}$$

which can be written in vector representation as:

$$\vec{S}_i(\lambda) = \sum_k (V_{ik} w_k)\vec{U}_k(\lambda) = \sum_k a_{ik}\vec{U}_k(\lambda)$$

Thus the sample vectors $\underline{S}_i(\lambda)$ are linear combinations of n basis vectors $\underline{U}_k(\lambda)$, k=1 . . . n.

The rows of U include the n basis vectors. W includes the weights of the basis vectors, the contribution each of the n basis vectors makes to the solution. The diagonal of W includes n constants, preferably between 0 and 1, representing the relative amount each of the n basis vectors makes to the solution. V contains the weighted decomposition coefficients.

Preferably, less than n primaries are to be determined. If there is dependence (or near dependence) between the m original sample vectors in such a way that the sub-space spanned by the m original sample vectors has lower dimensionality, some of the weights on the diagonal of W are zero or near zero. By eliminating certain rows of U including basis vectors corresponding to these low weights, a basis of lower dimensionality is obtained. The decision as to which weights are small enough is based on the required accuracy of the eventual reconstruction. Therefore, a reduced set of l basis vectors, l<n, which contribute most to the solution or which are most relevant to the reconstruction of the sample colors are identified, preferably based on the set of constants in the matrix W. The l highest constants are identified, and the l basis vectors corresponding to these constants are used. Alternately, the number of basis vectors used may be determined by determining which basis vectors contribute a certain percentage to the solution. For example the l basis vectors which contribute to 90% of the solution may be identified. In alternate embodiments the number of basis vectors need not be reduced.

The basis vectors $\underline{\Psi}_i(\lambda)$ are orthogonal, and therefore they may include negative numbers. Since the filters producing the primaries transmit light in proportions between 0 (no light transmitted) and 1 (complete transmission), the basis vectors preferably include only positive numbers, preferably between 0 and 1.

In one embodiment, a process similar to factor analysis is used to convert the set or the reduced set of basis vectors $\Psi_i(\lambda)$ to a set of basis vectors which are not-orthogonal and include positive numbers, preferably between 0 and 1. Preferably, the basis vectors are rotated, using known vector transformations, to determine a set of basis vectors such that $0 \leq \Psi_j(\lambda) \leq 1$ and that for any $\underline{S}_i(\lambda) \approx \Sigma_j \alpha_{ij} \underline{\Psi}_j(\lambda)$ the coefficients $0 \leq \alpha_{ij} \leq 1$.

A set of primary color spectra, and filters for those spectra, may be created from the resulting basis vectors. Preferably, for each basis vector, a curve is created from the n levels in the vector. Various methods may be used to create such a curve, such as interpolation. Such a curve is used to produce a filter passing a range of wavelengths corresponding to or substantially corresponding to the curve. This filter may be used in a display system according to an embodiment of the present invention to produce a primary color corresponding to the basis vector.

In alternate embodiments, other methods of determining basis vectors, such as component analysis (PCA), may be used. In one embodiment using PCA, m vectors $\underline{S}_i$ are gathered in the n-dimensional space, and the covariance matrix C is calculated, such as:

$$C_{\lambda1,\lambda2} \sum_i (S_{i\lambda1} - <S_i>)(S_{i\lambda2} - <S_i>)$$

where:

$$<S_i> = \sum_\lambda S_{i\lambda}$$

The covariance matrix is an n×n symmetric matrix. The eigenvalues and the eigenvectors of the covariance matrix are then found. The eigenvalues are the weights of each eigenvector in the basis. The basis vectors are orthogonal, and can be rotated so that a new basis is constructed which fulfils the requirements.

In alternate embodiments other series of steps may be used to convert a set of sample spectra to a set of primaries which may be used to produce those sample spectra.

A display according to an embodiment of the present invention accepts source data, such as RGB, CYM or YCC-type values, and converts the source data into primary levels for display. If a set of primaries has been created by referring to a set of sample spectra, as described above, and each spectrum of the set of sample spectra corresponds to certain source data values, such as dye concentrations or other values (RGB, YCC, etc.), the conversion of the source data into primary levels may involve reference to the set of data created during the selection of the primaries. When converting a set of m sample spectra to a set of l primaries, each sample spectrum may have been associated with a set of color values such as dye concentrations or primary values (e.g., a set of RGB or YCC-type levels). If the source data corresponds directly or easily to the set of color values, the color values used in the original conversion may be used to convert the source data to estimated primary levels which, in turn, may be used via interpolation to calculate the actual primary levels for the source data.

For example, source data may be RGB values from a source film or YCC values transformed to RGB values, and the primaries used in the display may have been created based on a set of samples defined by the RGB or YCC values. The RGB values represent the densities of the cyan magenta and yellow dyes, respectively, used to create the source film. To convert source data to a set of constants used to display primaries in an imaging system or monitor according to one embodiment of the present invention, first the transmission spectrum of the film is evaluated from the RGB values in the source data. A spectrum is constructed from the filter transmission spectra, and possibly in addition taking account of the required illumination. A set of constants is generated which allow the set of primaries to approximate the constructed spectrum. Preferably, a colorimetric difference between the spectra estimated from the source data and the spectra reconstructed using the primaries is calculated, and, if necessary, a correction is performed.

Various methods may be used to recreate the source spectrum from the source data A physical model for the transmission of the source film may be calculated, if the absorptions of the dyes are known along with the relationship between the density and the concentration of the dyes. For example, a model for recreating source spectrum from source data may be:

$$T(\lambda) = 10^{-D_R \alpha_c(\lambda)} \cdot 10^{-D_G \alpha_M(\lambda)} \cdot 10^{-D_B \alpha_y(\lambda)}$$

where $\alpha_i(\lambda)$, i=C, M, Y, are the absorbance of the relevant dye for a density 1. The densities $D_R$, $D_G$, $D_B$ are calculated from the source data. Thus, for a given source data value a spectrum $T(\lambda)$ can be evaluated. More elaborate physical models can also be implemented.

In an alternate embodiment, the transmission spectra may be evaluated by interpolation in a look-up-table. When determining the primaries, a set of spectra is measured to determine the filters, and RGB (or other source data) values have been associated with each spectrum, a spectrum may be found for each value of RGB by interpolating between spectra in the known set of sample spectra. In further embodiments, other methods may be used to produce transmission spectra.

After the transmission spectrum resulting from the source data is evaluated, the projected spectrum may be calculated from the light projected through the "virtual" film $S(\lambda)T(\lambda)$, where $S(\lambda)$ is a light source spectrum, possibly corrected by the optics of the projector. This projected spectrum may be calculated based on the reconstructed transmission data. The projected spectrum may be expressed as a function of the l-filters used with the by the l-primary monitor, allowing for the constants for the filters to be solved. Thus:

$$S(\lambda)T(\lambda) = \sum_{i=1}^{l} a_i S(\lambda) \Psi_i(\lambda)$$

Preferably, as shown in the equation above, the same light source is used for the film and the filter projector; in alternate embodiments different light sources may be used. Preferably, to solve the equation for the set of primary parameters $\alpha_i$, a constrained least squares method is used. Preferably the resulting parameters $\alpha_i$ are in the range [0,1] and are used to determine the proportions of the primaries for the monitor.

Alternately, to transform source data into a set of primary constants $\alpha_i$, the sets of primary constants created during the primary creation calculations may be used, and the resulting values interpolated. In one embodiment, when defining a set of primaries for use with a display system, a set of sample spectra associated with source data such as RGB values are created. While calculating the spectra for the primaries, each of the sample spectra are associated with a set of constants which may be used in conjunction with the resulting primaries to approximate the sample spectra. These constants may be placed in a look-up-table and indexed by the source data (e.g., RGB data) used to create the spectra. During the operation of a display system using the primaries, to convert source data to a set of primary constants, the look-up-table is referenced to find sets of constants close to the solution. Interpolation is performed on these sets of constants to produce a set of constants allowing the primaries to approximate the target spectrum.

Color correction on the resulting set of constants may be performed to obtain a better color match. The color correction involves a comparison between color coordinates of the projected spectrum based on the input data to that of the spectrum to be produced from the l-filter monitor. For given source values the color coordinates of light projected through the film can be evaluated, as shown above. In a similar manner, the color coordinates of the l-filter monitor can be evaluated. To correct any discrepancies between the source produced spectra and the primary produced spectra, and various methods may be used. For example, a colorimetric difference between the source and primary spectra may be calculated and the appropriate correction performed.

Conversion of source data to constants for use with primaries is preferably carried out by a processor or data converter which is part of a display system according to an exemplary embodiment of the present invention. Such a processor or data converter may be any conventional data processing device, such as a microprocessor, "computer on a chip," or graphics processor.

While the invention has been described with respect to a limited number of embodiments, it will be appreciated that many variations, modifications and other applications of the invention may be made.

What is claimed is:

1. A method of producing a color image comprising:
   projecting polychromatic light from a light source onto a first side of a color wheel having at least four non-white and non-black color filters;
   rotating said color wheel such that the polychromatic light from said light source is sequentially filtered by transmission through said at least four color filters to sequentially produce at a second side of said color wheel, opposite said first side, light of at least four colors, each of said at least four colors having a different chromaticity from the others of the at least four colors in accordance with a data signal; and
   spatially modulating said light of at least in accordance with a data signal four colors in accordance with a data signal to produce said color image.

2. The method of claim 1, wherein each of said at least four light colors is produced at least once during one rotation of said color wheel.

3. The method of claim 1, further comprising operating a motor attached to said color wheel for rotating said color wheel.

4. The method of claim 1, further comprising projecting said filtered light onto a viewing screen.

5. The method of claim 1, wherein said spatially modulating said light comprises selectively activating a spatial light modulator in accordance with said data signal.

6. The method of claim 5, wherein said spatial light modulator is a digital micro-mirror device (DMD).

7. The method of claim 5, wherein said selectively activating said spatial light modulator comprises activating said spatial light modulator to sequentially modulate the light of said at least four different colors in accordance with said data signal.

8. The method of claim 1, further comprising converting three-color data representing said color image in terms of three colors into converted image data representing said color image in terms of said at least four different colors.

9. The method of claim 8, further comprising:
   receiving image data representing said color image in terms of said at least four colors; and
   generating a formatted data signal including a sequence of color data arrays, each array including data representing at least part of said image data corresponding to one of said at least four colors.

10. The method of claim 9, wherein said spatially modulating said light comprises selectively activating a spatial light modulator based on said formatted data signal to produce a light pattern corresponding to said color image.

* * * * *

UNITED STATES PATENT AND TRADEMARK OFFICE
CERTIFICATE OF CORRECTION

| | |
|---|---|
| PATENT NO. | : 7,113,152 B2 |
| APPLICATION NO. | : 10/297672 |
| DATED | : September 26, 2006 |
| INVENTOR(S) | : Ilan Ben-David |

It is certified that error appears in the above-identified patent and that said Letters Patent is hereby corrected as shown below:

In column 24, lines 38 to 40, the text "spatially modulating said light of at least in accordance with a data signal four colors in accordance with a data signal to produce said color image." should read -- spatially modulating said light of at least four colors in accordance with a data signal to produce said color image.--

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO.        : 7,113,152 B2                               Page 1 of 1
APPLICATION NO. : 10/297672
DATED             : September 26, 2006
INVENTOR(S)       : Ilan Ben-David It is certified that error appears in the above-identified patent and that said Letters Patent is hereby corrected as shown below:

In column 24 line 37, delete the words "in accordancc with a data signal"

Signed and Sealed this

Third Day of April, 2007

JON W. DUDAS
*Director of the United States Patent and Trademark Office*

(12) INTER PARTES REEXAMINATION CERTIFICATE (0226th)
United States Patent
Ben-David et al.

(10) Number: US 7,113,152 C1
(45) Certificate Issued: Jan. 25, 2011

(54) DEVICE, SYSTEM AND METHOD FOR ELECTRONIC TRUE COLOR DISPLAY

(75) Inventors: Ilan Ben-David, Rosh Ha'ayin (IL); Moshe Ben-Chorin, Rehovot (IL)

(73) Assignee: Samsung Electronics Co., Ltd., Seocho-Gu, Seoul (KR)

Reexamination Request:
No. 95/000,348, Feb. 19, 2008
No. 95/000,347, Feb. 19, 2008
No. 95/001,031, Mar. 11, 2008

Reexamination Certificate for:
Patent No.: 7,113,152
Issued: Sep. 26, 2006
Appl. No.: 10/297,672
Filed: Dec. 9, 2002

Certificate of Correction issued Dec. 12, 2006.

Certificate of Correction issued Apr. 3, 2007.

(22) PCT Filed: Jun. 7, 2001

(86) PCT No.: PCT/IL01/00527

§ 371 (c)(1),
(2), (4) Date: Dec. 9, 2002

(87) PCT Pub. No.: WO01/95544

PCT Pub. Date: Dec. 13, 2001

Related U.S. Application Data

(63) Continuation of application No. 09/710,895, filed on Nov. 14, 2000, now Pat. No. 6,870,523
(60) Provisional application No. 60/209,771, filed on Jun. 7, 2000.

(51) Int. Cl.
*G09G 3/00* (2006.01)

(52) U.S. Cl. .................. 345/32; 345/84; 348/E9.027
(58) Field of Classification Search .............. None
See application file for complete search history.

(56) References Cited

U.S. PATENT DOCUMENTS

| | | | |
|---|---|---|---|
| 2,412,098 A | 12/1946 | Schantz |
| 4,527,186 A | 7/1985 | Acker |
| 5,083,857 A | 1/1992 | Hornbeck |
| 5,365,283 A | 11/1994 | Doherty et al. |
| 5,528,317 A | 6/1996 | Gove et al. |
| 5,535,047 A | 7/1996 | Hornbeck |
| 5,625,424 A | 4/1997 | Conner et al. |
| 5,650,832 A | 7/1997 | Poradish et al. |
| 5,668,572 A | 9/1997 | Meyer et al. |
| 6,147,720 A | 11/2000 | Guerinot et al. |
| 6,191,826 B1 | 2/2001 | Murakami et al. |
| 6,262,744 B1 | 7/2001 | Carrein |
| 6,310,591 B1 | 10/2001 | Morgan et al. |
| 6,324,006 B1 | 11/2001 | Morgan |
| 6,538,742 B1 | 3/2003 | Ohsawa |
| 6,567,134 B1 | 5/2003 | Morgan |

(Continued)

FOREIGN PATENT DOCUMENTS

| | | |
|---|---|---|
| JP | 6-261332 | 9/1994 |
| JP | H8-86994 | 4/1996 |
| JP | 11-264953 | 9/1999 |
| WO | WO-95/10160 A1 | 4/1995 |
| WO | WO 97/42770 | 11/1997 |

OTHER PUBLICATIONS

Yamaguchi, Masahiro, "Multiprimary Color Displays," Color Forum Japan '99, Nov. 9, 1999, pp. 73–79.

(Continued)

*Primary Examiner*—James Menefee

(57) ABSTRACT

A device, system and a method for displaying image data of a plurality of colors, the device comprising a light source (50) for producing light having at least four primary colors, a controller (56, 58) for determining a combination of at least four primary colors according to the image data (72) for production by the light source and a viewing screen (60) for displaying the image data the combination from the controller. The present invention is not limited to combinations of colors which are produced from only three primary colors, such as red, green and blue.

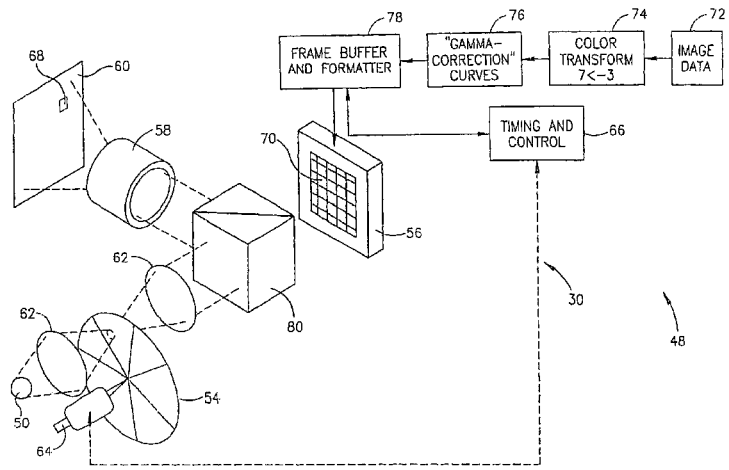

U.S. PATENT DOCUMENTS

| | | |
|---|---|---|
| 6,570,584 B1 | 5/2003 | Cok et al. |
| 6,633,302 B1 | 10/2003 | Ohsawa et al. |
| 6,674,489 B1 | 1/2004 | Kagawa et al. |
| 6,912,017 B1 | 6/2005 | Minami et al. |

OTHER PUBLICATIONS

M. Yamaguchi et al., "Multiprimary Color Display Using Holographic Optical Element," Proceedings of the SPIE, vol. 3293, pp. 70–77 (1998).

T. Ajito et al., "Multiprimary Color Display For Liquid Crystal Display Projectors Using Diffraction Grating," Optical Engineering, vol. 38 No. 11, pp. 1883–1888 (Nov. 1999).

R. Yajima et al., "Wide–Color Gamut System," Proc. of SMPTE, Advanced Television and Electronic Imaging, San Francisco, CA, 112–19 (1995).

M. Yamaguchi, "Multiprimary Color Displays," Color Forum Japan, pp. 73–79 (1999). Translation from Japanese by McElroy Translation Company.

T. Ajito et al., "Six–Primary Color Projection Display For Expanded Color Gamut Reproduction," Proceedings of International Symposium on Multi–spectral Imaging and Color Reproduction for Digital Archives, Society of Multi–Spectral Imaging of Japan, Chiba, Japan, pp. 135–138. (1999).

Masahirio Yamaguchi, "Multiprimary Color Displays," Color Forum Japan '99 Proceedings, Nov. 10–11, 1999, pp. 73–79.

Takeyuki Ajito et al., "Expanded Color Gamut Reproduced By Six–Primary Projection Display," Projection Displays 2000: Sixth in a Series, Proceedings of SPIE, Jan. 24–25, 2000, pp. 130–137.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-10 are cancelled.

\* \* \* \* \*